United States Patent
Tran et al.

(10) Patent No.: US 10,895,324 B2
(45) Date of Patent: Jan. 19, 2021

(54) ASPIRATING FACE SEAL ASSEMBLY FOR A ROTARY MACHINE

(71) Applicant: General Electric Company, Schenectady, NY (US)

(72) Inventors: Quang Tue Nguyen Tran, Munich (DE); Nathan Evan McCurdy Gibson, Cincinnati, OH (US); Rodrigo Rodriguez Erdmenger, Munich (DE); Christopher Edward Wolfe, Niskayuna, NY (US); Steven Douglas Johnson, Milford, OH (US); Antonio Guijarro Valencia, Munich (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 108 days.

(21) Appl. No.: 16/201,669

(22) Filed: Nov. 27, 2018

(65) Prior Publication Data
US 2020/0166143 A1    May 28, 2020

(51) Int. Cl.
*F16J 15/44*    (2006.01)
*F01D 5/22*     (2006.01)
(Continued)

(52) U.S. Cl.
CPC ............. *F16J 15/443* (2013.01); *F01D 5/20* (2013.01); *F01D 5/225* (2013.01); *F16J 15/40* (2013.01);
(Continued)

(58) Field of Classification Search
CPC .......... F16J 15/443; F16J 15/44; F16J 15/445; F16J 15/447; F16J 15/4472;
(Continued)

(56) References Cited

U.S. PATENT DOCUMENTS

| | | | | |
|---|---|---|---|---|
| 4,726,397 A | * | 2/1988 | Stich .................. | F16L 27/0828 137/580 |
| 4,948,151 A | * | 8/1990 | Janzen ................ | F16J 15/3468 277/359 |

(Continued)

FOREIGN PATENT DOCUMENTS

| | | |
|---|---|---|
| WO | 2017180682 A1 | 10/2017 |
| WO | 2017196563 A1 | 11/2017 |
| WO | 2018022314 A1 | 2/2018 |

OTHER PUBLICATIONS

Hwang et al., "Advanced seals for engine secondary flowpath", Journal of Propulsion and Power, vol. 12, Issue: 4,pp. 794-799, Ohio, 1996.
(Continued)

*Primary Examiner* — Nathan Cumar
(74) *Attorney, Agent, or Firm* — Josef L. Hoffmann; The Small Patent Law Group, LLC

(57) ABSTRACT

A seal assembly for a rotary machine includes a seal bearing face that opposes a rotating component of the machine and a slide device coupled with the seal bearing face. The slide device axially moves toward the rotating component responsive to pressurization of the rotary machine. The slide device includes cross-over ports and the seal bearing includes feed ports. The feed ports extend through the seal bearing face to form aerostatic portions of a film bearing between the seal bearing face and the rotating component. The seal bearing face and/or the rotating component has a non-planar surface that, during rotating motion of the rotating component relative to the face of the seal bearing face, forms aerodynamic portions of the film bearing.

20 Claims, 22 Drawing Sheets

(51) Int. Cl.
    *F01D 5/20*    (2006.01)
    *F16J 15/40*   (2006.01)
(52) U.S. Cl.
    CPC ......... *F16J 15/445* (2013.01); *F05D 2220/30*
        (2013.01); *F05D 2240/11* (2013.01); *F05D*
        *2240/128* (2013.01); *F05D 2240/53* (2013.01);
                                    *F05D 2240/55* (2013.01)
(58) Field of Classification Search
    CPC .. F16J 15/4474; F16J 15/4476; F16J 15/4478;
            F01D 5/20; F01D 5/225; F05D 2220/00;
            F05D 2220/30; F05D 2240/50; F05D
                            2240/52–53; F05D 2240/55
    USPC ......................................................... 277/411
    See application file for complete search history.

(56)            References Cited

U.S. PATENT DOCUMENTS

| | | | | |
|---|---|---|---|---|
| 5,080,401 | A * | 1/1992 | Stich | F16L 27/087 |
| | | | | 285/190 |
| 5,284,347 | A * | 2/1994 | Pope | F01D 11/025 |
| | | | | 277/305 |
| 5,496,047 | A * | 3/1996 | Goldswain | F16J 15/3412 |
| | | | | 277/400 |
| 5,975,537 | A * | 11/1999 | Turnquist | F16J 15/443 |
| | | | | 277/411 |
| 6,676,369 | B2 | 1/2004 | Brauer | F01D 11/025 |
| | | | | 415/113 |
| 6,758,477 | B2 * | 7/2004 | Brauer | F01D 11/02 |
| | | | | 277/379 |
| 8,172,232 | B2 * | 5/2012 | Justak | F01D 11/025 |
| | | | | 277/411 |
| 8,272,643 | B2 * | 9/2012 | Garrison | F01D 11/001 |
| | | | | 277/348 |
| 9,291,067 | B2 * | 3/2016 | Zheng | F01D 11/003 |
| 9,587,501 | B2 * | 3/2017 | Zheng | F16J 15/3464 |
| 9,611,749 | B2 * | 4/2017 | Thatte | F01D 1/04 |
| 9,771,977 | B2 * | 9/2017 | Rodriguez Erdmenger | |
| | | | | F16C 32/0622 |
| 9,976,420 | B2 * | 5/2018 | Tran | F01D 5/046 |
| 2001/0006278 | A1 * | 7/2001 | Haje | F16J 15/164 |
| | | | | 277/412 |
| 2007/0253809 | A1 * | 11/2007 | Glynn | F01D 11/04 |
| | | | | 415/174.2 |
| 2008/0018054 | A1 * | 1/2008 | Herron | F01D 11/02 |
| | | | | 277/409 |
| 2009/0033037 | A1 * | 2/2009 | Varanasi | F01D 11/005 |
| | | | | 277/355 |
| 2012/0038113 | A1 * | 2/2012 | Dietle | F16J 15/166 |
| | | | | 277/301 |
| 2012/0251290 | A1 * | 10/2012 | Turnquist | F01D 11/001 |
| | | | | 415/1 |
| 2014/0008871 | A1 * | 1/2014 | Bidkar | F04D 29/526 |
| | | | | 277/303 |
| 2014/0035274 | A1 * | 2/2014 | LaCroix | F16L 17/00 |
| | | | | 285/95 |
| 2014/0119912 | A1 * | 5/2014 | Bidkar | F01D 11/02 |
| | | | | 415/229 |
| 2015/0130138 | A1 * | 5/2015 | Zheng | F01D 11/003 |
| | | | | 277/307 |
| 2017/0022837 | A1 * | 1/2017 | Tran | F01D 5/046 |
| 2017/0051834 | A1 * | 2/2017 | Webster | F16J 15/447 |
| 2017/0058951 | A1 * | 3/2017 | Rodriguez Erdmenger | |
| | | | | F16C 32/0622 |
| 2017/0314409 | A1 * | 11/2017 | Erdmenger | F01D 11/04 |
| 2018/0003067 | A1 * | 1/2018 | Bidkar | F16J 15/3488 |
| 2018/0003069 | A1 * | 1/2018 | Bidkar | F16J 15/40 |

OTHER PUBLICATIONS

Xu et al., "Spiral-grooved gas face seal for steam turbine shroud tip leakage reduction: Performance and feasibility analysis", Tribology International, vol. 98, pp. 242-252, China, Jun. 2016.

* cited by examiner

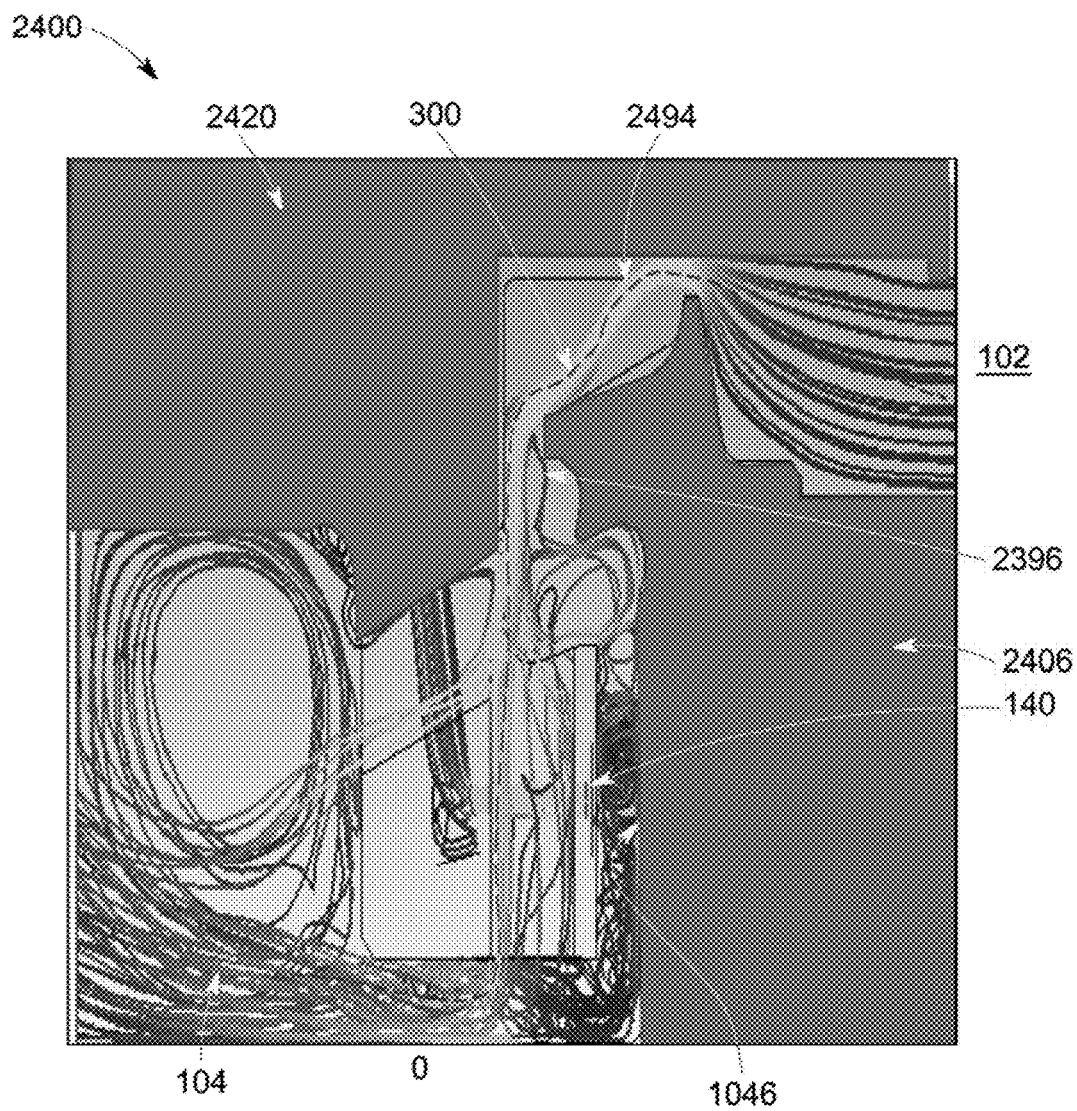
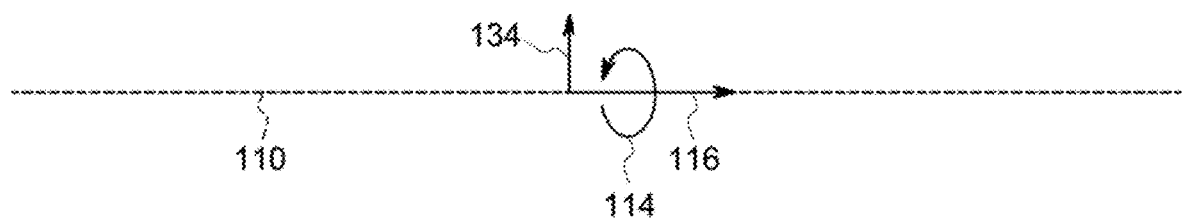
FIG. 24

ASPIRATING FACE SEAL ASSEMBLY FOR A ROTARY MACHINE

FIELD

The subject matter described herein relates to seal assemblies between rotating and stationary components in rotary machines.

BACKGROUND

Many rotary machines, such as gas turbines, steam turbines, aircraft engines, supercritical CO2 turbines, compressors and other rotary machines, have seals between the moving components (e.g., rotors) and the stationary components (e.g., stators). These seals help to reduce leakage of fluids between the rotors and stators. Increased leakage between rotors and stators can significantly reduce the power generated by the rotary machines; thereby lowering the operating efficiency of the rotary machines.

Some known seals between the rotating and stationary components provide for satisfactory pressure drops across the seals. But, improvements to these seals can be made to further increase the pressure drop across the seals by reducing the fluid leakage across the seals.

BRIEF DESCRIPTION

In one embodiment, a seal assembly for a rotary machine is provided. The seal assembly is configured to be positioned between a rotating component and a stationary component of the rotary machine. The seal assembly includes a seal bearing having a face that opposes the rotating component of the rotary machine and a slide device coupled with the seal bearing. The slide device is configured to be positioned between a first fluid pressure volume in the rotary machine and a different, second fluid pressure volume in the rotary machine. The slide device is configured to axially move parallel to a rotation axis of the rotary machine and toward the rotating component of the rotary machine responsive to pressurization of the rotary machine. The slide device includes one or more cross-over ports and the seal bearing includes one or more feed ports. The one or more feed ports extend through the face of the seal bearing to form one or more aerostatic portions of a film bearing between the face of the seal bearing and the rotating component of the rotary machine. The face of the seal bearing or the rotating component is a non-planar surface that, during rotating motion of the rotating component relative to the face of the seal bearing, forms one or more aerodynamic portions of the film bearing between the face of the seal bearing and the rotating component of the rotary machine.

In one embodiment, a seal assembly for a rotary machine is provided. The seal assembly is configured to be positioned between a rotating component and a stationary component of the rotary machine. The seal assembly includes a seal bearing having a face that opposes the rotating component of the rotary machine and a slide device coupled with the seal bearing. The slide device is configured to be positioned between a first fluid pressure volume in the rotary machine and a different, second fluid pressure volume in the rotary machine. The slide device is configured to axially move parallel to a rotation axis of the rotary machine and toward the rotating component of the rotary machine responsive to pressurization of the rotary machine. The slide device includes cross-over ports and one or more of the seal bearing or the rotating component includes feed ports. The one or more feed ports form an aerostatic film bearing between the face of the seal bearing and the rotating component of the rotary machine. The feed ports form differently-sized openings through one or more of the rotating component or the face of the seal bearing.

In one embodiment, a seal assembly for a rotary machine is provided. The seal assembly is configured to be positioned between a rotating component and a stationary component of the rotary machine. The seal assembly includes a seal bearing having a face that opposes the rotating component of the rotary machine and a slide device coupled with the seal bearing, the slide device configured to be positioned between a first fluid pressure volume in the rotary machine and a different, second fluid pressure volume in the rotary machine. The slide device is configured to axially move parallel to a rotation axis of the rotary machine and toward the rotating component of the rotary machine responsive to pressurization of the rotary machine. The slide device includes cross-over ports and the seal bearing includes feed ports, where the feed ports extend through the face of the seal bearing to form differently-sized openings on the face of the seal bearing. The feed ports are configured to form an aerostatic portion of a film bearing between the face of the seal bearing and the rotating component of the rotary machine. The face of the seal bearing is a non-planar surface that, during rotating motion of the rotating component relative to the face of the seal bearing, forms an aerodynamic portion of the film bearing between the face of the seal bearing and the rotating component of the rotary machine.

BRIEF DESCRIPTION OF THE DRAWINGS

The present inventive subject matter will be better understood from reading the following description of non-limiting embodiments, with reference to the attached drawings, wherein below:

FIG. 24 illustrates a cross-sectional view of a slide device and a rotating component of another embodiment of a seal assembly;

DETAILED DESCRIPTION

One or more embodiments of the inventive subject matter described herein provide seal assemblies for rotary machines. The seal assemblies are film-riding hybrid aerostatic-aerodynamic seals for sealing rotor-stator circumferential gaps in gas turbines, steam turbines, aircraft engines, supercritical CO2 turbines, centrifugal compressors, and other rotary machinery. As used herein, the terms "aerostatic" and "aerodynamic" are used to refer to the types of load-bearing pressures in a fluid film formed between the seal assembly and a rotor. The aerostatic forces are fluid film forces created due to pressurization and are thus pressure-dependent in nature. The aerodynamic forces are forces in the fluid film that are dependent on the speed at which the rotor rotates. The term "aero" or fluid should not restrict all embodiments of the inventive subject matter described herein to air as the working fluid. The seal assemblies can operate with other working fluids such as nitrogen, hydrogen, supercritical and gaseous CO2, and steam. In one embodiment, a seal includes an assembly of several segments forming a 360-degree assembly to reduce the rotor-stator leakage.

Figure 1:
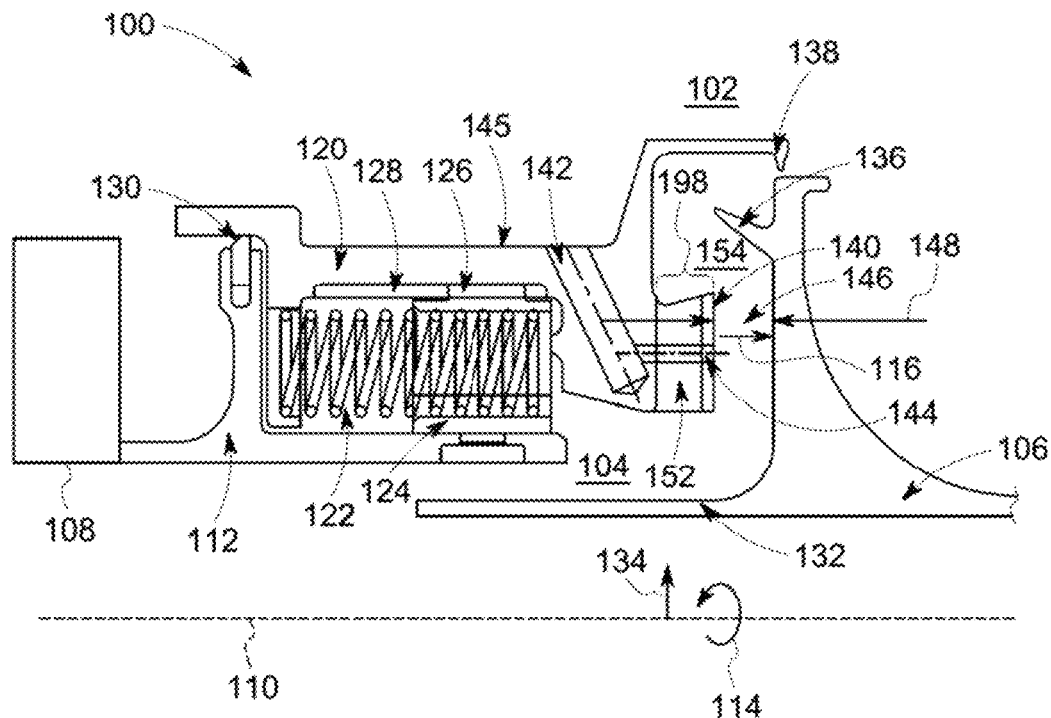
FIG. 1 illustrates a cross-sectional view of one embodiment of an aspirating face seal assembly.

FIG. 1 illustrates a cross-sectional view of one embodiment of an aspirating face seal assembly 100. The seal assembly 100 is a film-riding face seal that forms a seal between a higher fluid pressure side or volume 102 (which also can be referred to as an outboard side or volume) and a lower fluid pressure side or volume 104 (which also can be referred to as an inboard side or volume in a rotary machine (e.g., a turbomachine). In the perspective of FIG. 1, the higher-pressure side or volume 102 is above the seal assembly 100 and the lower pressure side or volume 104 is beneath the seal assembly 100.

While the description herein focuses on the side or volume 102 having greater pressure than the side or volume 104, not all embodiments are limited in this way. For example, one or more embodiments may have greater fluid pressure in the side or volume 104 and lower fluid pressure in the side or volume 102.

The fluid may be air or other gases in the rotary machine. The rotary machine includes a rotating component 106, such as a rotor, and a stationary or non-rotating component 108, such as a stator. The seal assembly 100 forms a fluid seal between the rotating component 106 and the stationary component 108. The stationary component 108 is schematically shown in FIG. 1 and may have another shape or appearance from what is shown. Only part of the rotating component 106 and part of the stationary component 108 is visible in FIG. 1. The rotating component 106 rotates about or around an axis of rotation 110, which also can be referred to as a center line of the rotary machine. In the perspective of FIG. 1, the rotating component 106 rotates in and out of the plane of the page along a rotational or circumferential direction 114. The components shown in the cross-sectional views herein may extend entirely around the axis of rotation 110 or may be a curved segment of several segments that, when combined, extend entirely around the axis of rotation 110.

The seal assembly 100 includes a stationary slider device 112 that is coupled with the stationary component 108. Optionally, the slider device 112 may be part of (e.g., an extension of) the stationary component 108 such that the slider device 112 in FIG. 1 also represents the stationary component 108. The slider device 112 interfaces with a slide device 120 that can move toward or away from the rotating component 106 in directions along or opposite to an axial direction 116. The axial direction 116 is along or parallel to the axis of rotation 110.

A resilient member 122 is coupled with both the slider device 112 and the slide device 120. The resilient member 122 can include a spring having one end coupled with the slider device 112 and an opposite end that is disposed within and coupled with a cartridge 124 that is coupled with the slide device 120. The resilient member 122 applies a force on the slide device 120 to hold the slide device 120 toward the slider device 112 and away from the rotating component 106 (opposite to the axial direction 116). Optionally, the resilient member 122 can be another elongated body that applies a force on the slide device 120 in a direction that is opposite to the axial direction 116. The slider device 112 and the slide device 120 can be formed as rings extending around the axis of rotation 110. The slider device 112 and the slide device 120 can each be a continuous ring or can be formed of segmented parts that each partially extends around the axis of rotation 110.

The slider device 112 and the slide device 120 also interface with each other by a protrusion 126 that moves within a recess 128. In the illustrated embodiment, the slide device 120 includes a protruding tongue as the protrusion 126 and the slider device 112 includes a groove as the recess 128. Alternatively, the slider device 112 can include the protrusion 126 and the slide device 120 can include the recess 128. The protrusion 126 extends from the slide device 120 in a radial direction 134 toward the axis of rotation 110. The protrusion 126 can be elongated in a direction that is parallel to the axial direction 116. Alternatively, the protrusion 126 may extend in another direction, may not be elongated, or may be elongated in another direction. The protrusion 126 can move back-and-forth within the recess 128 as the slide device 120 moves back-and-forth along (and opposite to) the axial direction 116. The receipt of the protrusion 126 within the recess 128 helps to guide and restrict movement of the slide device 120 relative to the slider device 112. Alternatively, the seal assembly 100 may not include the protrusion 126 or recess 128.

A piston seal 130 may be disposed between the slider device 112 and the slide device 120. The piston seal 130 can be a resilient ring-shaped body that encircles the slider device 112 and that is disposed between the slider device 112 and the slide device 120. The piston seal 130 provides a secondary seal within the seal assembly 100 to prevent or reduce leakage of fluid from the higher-pressure side or volume 102 to the lower pressure side or volume 104 (relative to the seal assembly 100 not having the piston seal 130). An oil deflector 132 of the rotating component 106 can extend in a direction that is opposite of the axial direction 116. The oil deflector 132 also can extend between part of the slide device 120 and the axis of rotation 110 along a radial direction 134. Alternatively, the rotating component 106 may not include the axially elongated oil deflector 132.

The axially mobile slide device 120 has a seal bearing 198 with a face 140 that faces the rotating component 106. The seal bearing 198 may protrude from the slide device 120 in the axial direction 116 or may be coextensive with the surface of the slide device 120 that faces the rotating component 106. The seal bearing face 140 is located on a side of the slide device 120 that is opposite of the side of the slide device 120 that faces the slider device 112. The seal bearing face 140 can be in the shape of a ring or a segment of a ring that encircles the axis of rotation 110.

The seal assembly 100 includes a primary sealing tooth 136 and a starter sealing tooth 138. Optionally, the seal assembly 100 can include several primary teeth 136 and/or several starter teeth 138. The primary tooth 136 is an elongated body that extends in a direction that is opposite the axial direction 116 in the illustrated embodiment. Alternatively, the primary tooth 136 can extend in a direction that is parallel to or along the axial direction 116. The starter tooth 138 is an elongated body that extends in a direction that is opposite the radial direction 134. Alternatively, the starter tooth 138 can extend in a direction that is along the radial direction 134. In another embodiment, the primary tooth 136 can be elongated and protrude in another direction (e.g., the radial direction 134) and/or the starter tooth 138 can be elongated and protrude in another direction (e.g., the axial direction 116 or opposite the axial direction 116), as described below. The primary and/or starter teeth 136, 138 can be arranged in a variety of different ways on the slide device 120 and/or the rotating component 106.

The slide device 120 includes one or more transfer ports 142 that extend from a radially outer surface 145 of the slide device 120 into the slide device 120 from the higher fluid pressure side or volume 102. The transfer ports 142 are fluidly coupled with one or more feed ports 144 that extend through the slide device 120 to the seal bearing face 140. The feed ports 144 are elongated along directions that are along or parallel to the axial direction 116. The transfer ports 142 and the feed ports 144 form one or more conduits that fluidly couple the higher fluid pressure side or volume 102 with an internal cavity 146 that is located between the slide device 120 and the rotating component 106. Optionally, the feed ports 144 can extend through the rotating component 106. For example, the feed ports 144 can provide conduits through the rotating component 106 so that fluid can pass from the side or volume 102 to the side or volume 104 through the rotating component 106.

In operation, an increased fluid pressure is formed on the higher-pressure side or volume 102 of the seal assembly 100 than on the lower pressure side 104 of the seal assembly 100. The seal assembly 100 (e.g., the radially outer surfaces of the slider device 112 and the slide device 120) may be directly or indirectly coupled or sealed with an internal surface of a housing of the rotary machine. The resilient member 122 pulls the slide device 120 toward the slider device 112 in a direction that is opposite to the axial direction 116 and away from the rotating component 106. Fluid pressure from the side or volume 102 can urge or force the slide device 120 away from the slider device 112 and toward the rotating component 106 (e.g., in the axial direction 116 and opposite to the direction in which the resilient member 122 pulls the slide device 120).

As the slide device 120 moves toward the rotating component 106, the starter tooth 136 can come closer to the rotating component 106 (as shown in FIG. 1). This movement reduces the space through which fluid can move from the higher-pressure side or volume 102 to the lower pressure side or volume 104. The slide device 120 continues to move toward the rotating component 106 until an outer end of the primary tooth 136 contacts the slide device 120. Optionally, the outer end of the primary tooth 136 can come into close enough proximity with the rotating component 106 to form a film bearing or seal between the primary tooth 136 and the rotating component 106. This bearing or seal can prevent or reduce leakage of fluid from the higher-pressure side 102 to the lower pressure side 104 between the slide device 120 and the rotating component 106.

Some of the fluid in the higher-pressure side 102 moves through the transfer ports 142 and feed ports 144 to the cavity 146. This fluid forms an axial fluid film bearing 148 between the seal bearing face 140 and the rotating component 106. An axial thickness of this film bearing 148 is shown in an exaggerated size in FIG. 1. The axial thickness may be on the order of three to six mils, in one embodiment. Alternatively, the thickness may be smaller than three mils or larger than six mils. The axial separation between the slide device 120 and the primary tooth 136 can be reduced such that a seal is formed between the slide device 120 and the rotating component 106 at the interface between the slide device 120 and the primary tooth 136. The fluid pressure on opposite sides of the seal assembly 100 drops from a higher pressure (referred to as $P_{high}$ herein) to a lower pressure (referred to as $P_{low}$ herein) across the primary tooth 136.

In the illustrated embodiment, the slide device 120 can include one or more cross-over ports 152 that radially extend through the slide device 120 in locations that are on the side of the seal bearing face 140 that is opposite the rotating component 106. The cross-over ports 152 fluidly couple the higher-pressure volume 102 in a location 154 that is downstream of the primary tooth 138 but upstream of the seal bearing face 140 with the lower fluid pressure volume 104. The higher fluid pressure volume 102 is upstream of the lower fluid pressure volume 104.

Figure 2:
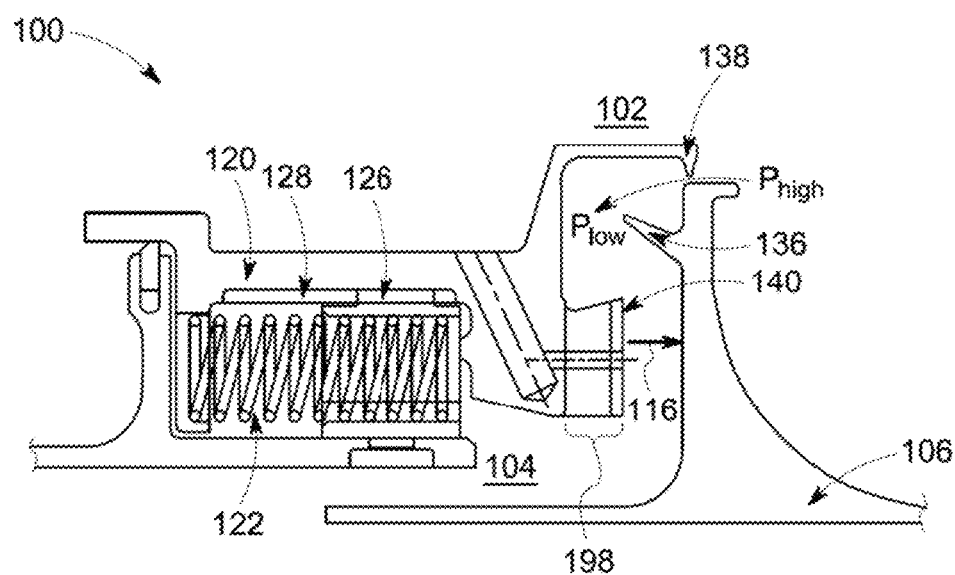
FIG. 2 illustrates operation of the seal assembly shown in FIG. 1.
Figure 3:
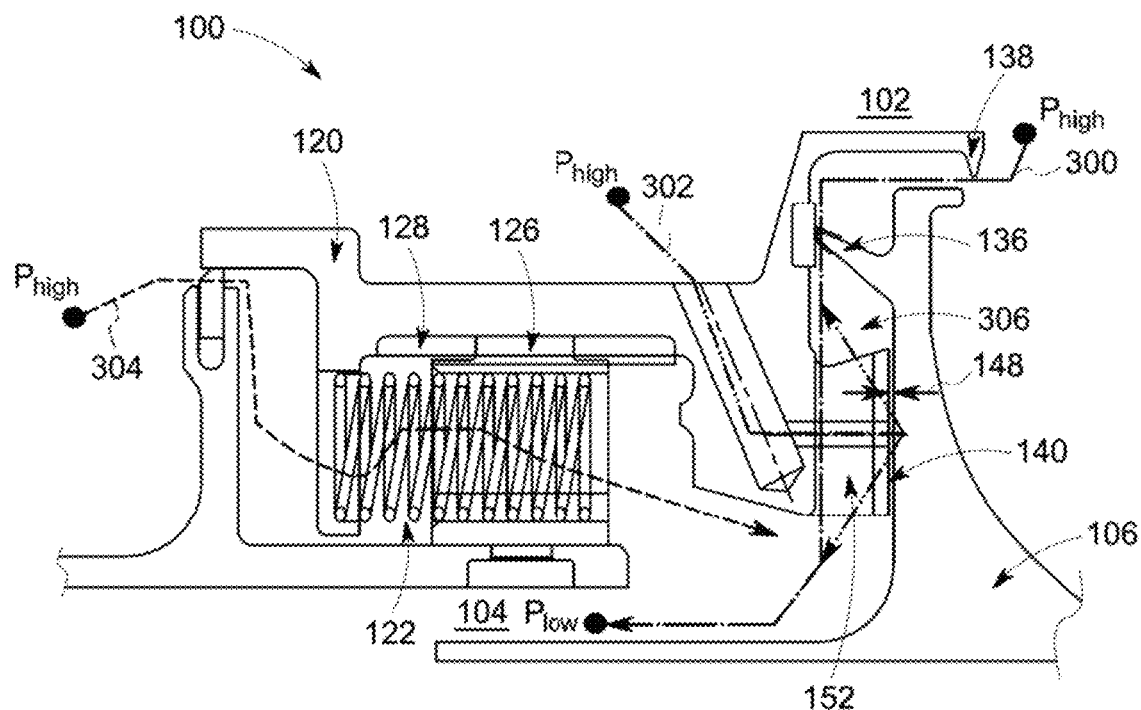
FIG. 3 also illustrates operation of the seal assembly shown in FIG. 1.

FIGS. 2 and 3 illustrate operation of the seal assembly 100 shown in FIG. 1. In operation, prior to pressurization of the rotary machine (e.g., prior to rotation of blades or air foils coupled with the rotating component 106 and as shown in FIG. 2), the slide device 120 is held away from the rotating component 106 by the resilient member 122. Upon pressurization of the rotary machine (e.g., after rotation of the blades or air foils coupled with the rotating component 106 has begun and as shown in FIG. 3), the higher fluid pressure in the volume 102 forces the slide device 120 along the axial direction 116 toward the rotating component 106. This fluid pressure exerts a force on the slide device 120 that overcomes the force applied by the resilient member 122 in an opposite direction until an equilibrium film thickness 148 is achieved between the seal bearing face 140 and the rotating component 106. The force exerted by the higher-pressure fluid can be referred to as a closing force or pressure ($F_{closing}$ in FIG. 4) as this force or pressure moves the slide device 120 toward the rotating component 106 to close the distance between the slide device 120 and the rotating component 106. The force exerted by the resilient member 122 pulling the slide device 120 away from the rotating component 106 can be referred to as an opening force or pressure ($F_{spring}$ in FIG. 4) as this force or pressure moves the slide device 120 away from the rotating component 106 to increase the distance between the slide device 120 and the rotating component 106. The axial motion of the slide device 120 toward and/or away from the rotating component 106 is directed or constrained by the protrusion 126 in the recess 128.

For example, with no pressurization of the rotary machine, the slide device 120 is far away from the rotating component 106, as shown in FIG. 2. Upon pressurization of the rotary machine, a pressure drop occurs across the starter tooth 138 because the starter tooth 138 is a smaller or the smallest restriction for the flow of fluid from the higher-pressure side or volume 102 to the lower pressure side or volume 104. The sum of pressure-actuated forces on the slide device 120 that urge the slide device 120 toward the rotating component 106 (e.g., the closing forces are larger than the sum of pressure-actuated forces urging the slide device 120 away from the rotating component 106). Consequently, upon pressurization of the rotary machine, the slide device 120 axially moves towards the rotating component 106, and the primary tooth 136 starts reducing the space through which fluid can flow between the slide device 120 and the rotating component 106 from the higher-pressure side or volume 102 to the lower pressure side or volume 104. The primary tooth 136 forms a restriction by beginning to restrict this space because the primary tooth 136 is elongated toward the slide device 120 (in the illustrated embodiment).

At a certain distance from the rotating component 106, the restriction formed by the primary tooth 136 becomes smaller than the restriction between the slide device 120 and the rotating component 106 formed by the starter tooth 138, as shown in FIG. 3. At this point, the pressure drop between the higher and lower fluid pressures occurs across the primary tooth 136. The fluid leakage past the primary tooth 136 leaves a downstream cavity 306 (shown in FIG. 3) via the cross-over ports 152.

Several leakage paths 300, 302, 304 can form across or through the seal assembly 100 while in the pressurized state, as shown in FIG. 3. These leakage paths 300, 302, 304 allow at least some fluid to move between the seal assembly 100 and the rotating component 106 from the higher fluid pressure side 102 to the lower fluid pressure side 104. The leakage path 300 can be located between the primary tooth 136 and can be referred to as a tooth leakage path 300. The leakage path 302 can be located through the transfer and feed ports 142, 144 and can be referred to as a port leakage path 302. The leakage path 304 can be located between the piston seal 130 and the slide device 120 and can be referred to as a seal leakage path 304. One or more embodiments of the inventive subject matter described herein provide features of the seal assembly 100 and/or the rotating component 106 that reduce the amount of fluid that passes through one or more of the leakage paths 300, 302, 304 from the higher fluid pressure side or volume 102 to the lower fluid pressure side or volume 104.

Figure 4:
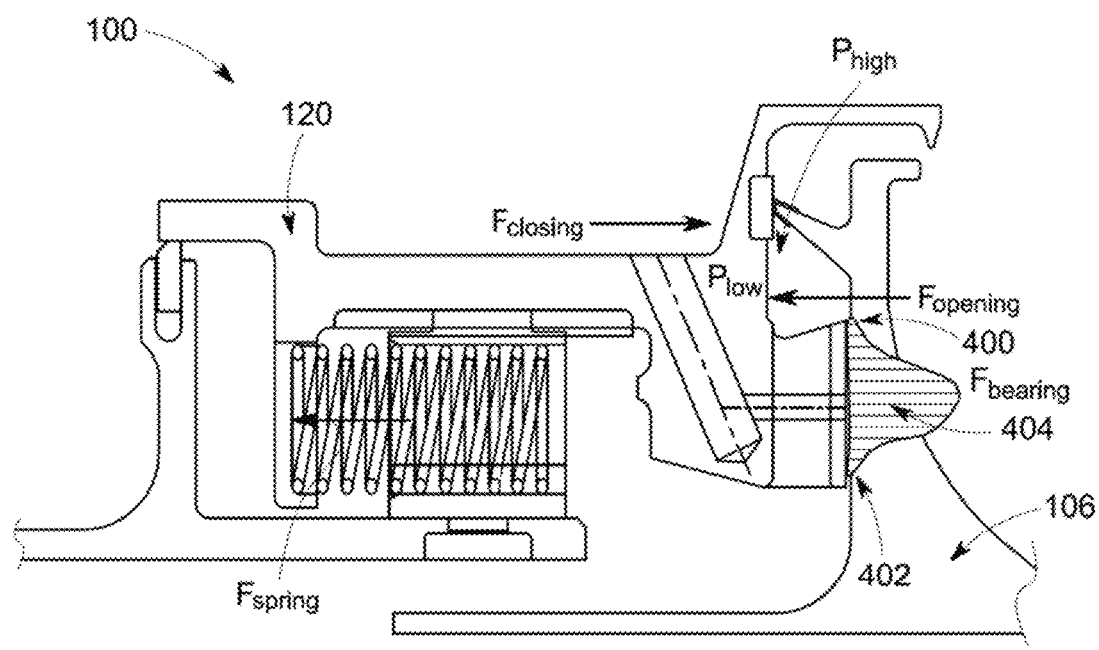
FIG. 4 illustrates forces acting on the components of the seal assembly shown in FIG. 1 while the rotary machine is pressurized.

FIG. 4 illustrates forces acting on the components of the seal assembly 100 while the rotary machine is pressurized. With the primary tooth 136 forming the pressure restriction, upper and lower edges 400, 402 of the seal bearing face 140 are subjected to a lower fluid pressure $P_{low}$ while the feed ports 144 direct fluid toward the radial center of the seal bearing face 140. This brings higher fluid pressure to the radial center of the seal bearing face 140 to form a greater fluid pressure in the radial center of the seal bearing face 140.

In one or more embodiments described below, the feed ports 144 direct higher-pressure fluid to counterbores present on the slider bearing face 140. This presence of feed ports 144 and/or counterbores leads to the formation of an aerostatic bearing 148 between the seal bearing face 140 and the opposing surface of the rotating component 106. This aerostatic bearing 148 prevents contact between the seal bearing face 140 and the rotating component 106.

A stiffness curve 404 shows the stiffness characteristics of the aerostatic bearing 148 at different radial locations on the seal bearing face 140. The magnitudes of the stiffness of the fluid aerostatic bearing 148 between the seal bearing face 140 and the opposing surface of the rotating component 106 are represented by the curve 404, with locations having larger magnitudes of the stiffness extending farther to the right in the perspective of FIG. 4. These stiffness characteristics of the aerostatic bearing 148 ensure that the bearing pressure increases with a reduction in the thickness of the film bearing 148. Thus, as the slide device 120 and the bearing face 140 approach the rotating component 106, the bearing pressure increases in magnitude. At a certain film thicknesses (typically less than 0.020 inch), the bearing pressure is sufficient to balance the remaining axial-direction forces. These axial-direction forces act on the seal bearing face 140 and include the closing force $F_{closing}$ imparted by the higher pressure fluid, opening forces $F_{opening}$ also imparted the fluid pressure leaking past the restriction formed by the primary tooth 136, a friction force applied by the seal 130, the force applied by the resilient body 122 ($F_{spring}$ in FIG. 4), and any inertial forces of the slide device 120. This balancing results in a seal formed by this aerostatic bearing 148 operating at an equilibrium clearance between the seal bearing face 140 and the rotating component 106.

As the clearance between the primary tooth 136 and the slide device 120 is reduced, fluid leakage between the slide device 120 and the rotating component 106 from the higher-pressure side or volume 102 to the lower pressure side or volume 104 is reduced. The magnitude or size of the primary tooth clearance is governed by the thickness of the film bearing 148 that separates the rotating component 106 and the slider bearing face 140. Consequently, a reduced film thickness separating the rotating component 106 and the slider bearing face 140 can be desirable to reduce the fluid leakage past the primary tooth 136. But, reducing the thickness of the aerostatic bearing 148 also can lead to an undesirable reduction in the stiffness of the aerostatic bearing 148.

In one embodiment, the stiffness of the aerostatic bearing 148 is a relationship between (a) the pressure exerted by the bearing 148 on the seal bearing face 140 (and/or the opposing surface of the rotating component 106) and/or an opening force ($F_{opening}$ in FIG. 4) exerted on the seal bearing face 140 and (b) the thickness of the bearing 148 (as measured along the axial direction 116 from the seal bearing face 140 to the opposing surface of the rotating component 106. The stiffness of this bearing 148 can be defined as the increasing in the pressure or opening force exerted by the film bearing 148 for a unit reduction in the thickness of the film bearing 148.

Figure 5:
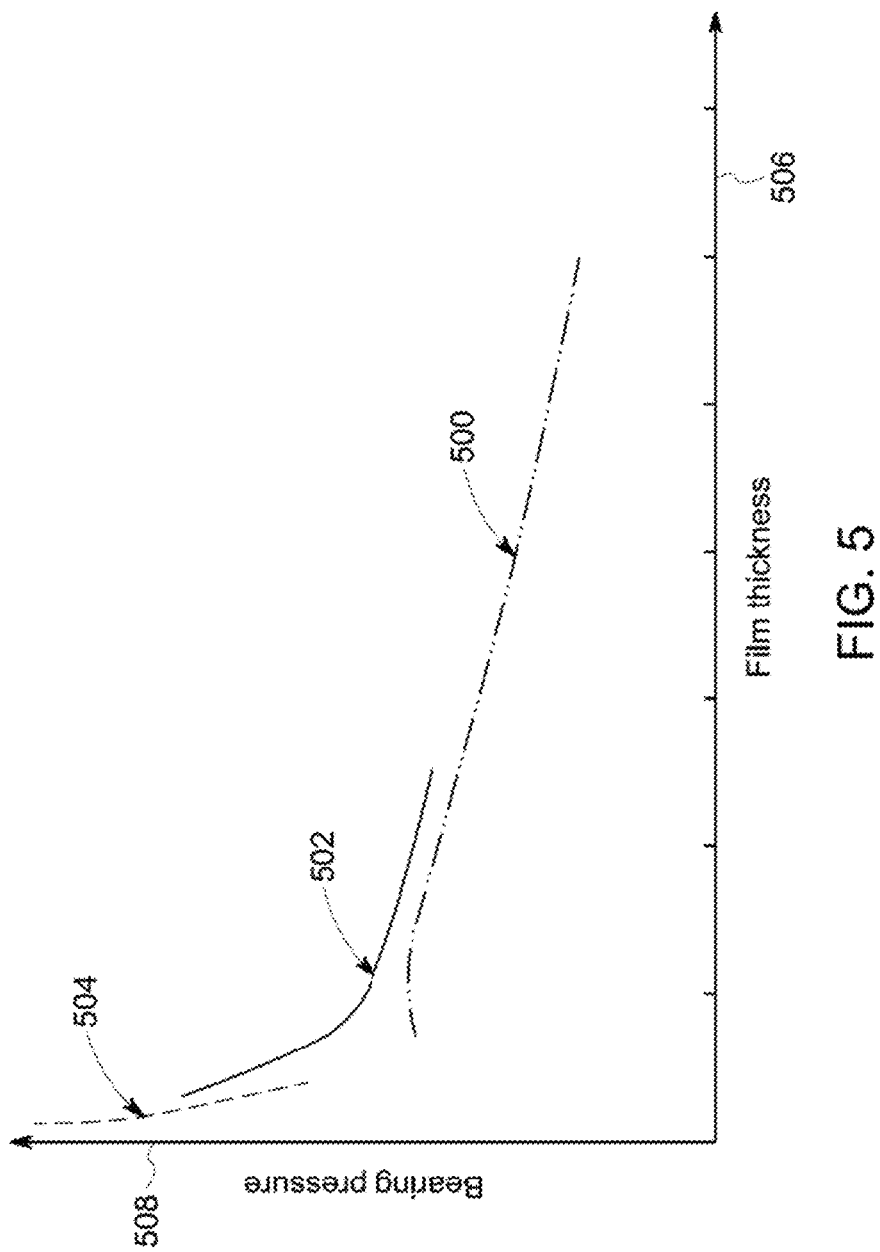
FIG. 5 illustrates examples of stiffness curves for a film bearing formed by the seal assembly shown in FIG. 1.

FIG. 5 illustrates examples of stiffness curves 500, 502, 504 for the film bearing 148. The stiffness curves 500, 502, 504 can define the relationships between the thickness of the film bearing 148 and the pressures or forces exerted by the film bearing 148 at different thicknesses. The stiffness curves 500, 502, 504 are shown alongside a horizontal axis 506 representative of thicknesses of the film bearing 148 and alongside a vertical axis 508 representative of the pressures or forces exerted by the film bearing 148 on the seal bearing face 140 at the corresponding thicknesses. Each stiffness curve 500, 502, 504 represents the relationship between pressures and thickness for a different type of film bearing 148. For example, the stiffness curve 500 represents the relationship between pressures and thickness for an aerostatic film bearing 148 (and not an aerodynamic film bearing 148), the stiffness curve 502 represents the relationship between pressures and thickness for a combined aerostatic and aerodynamic film bearing 148, and the stiffness curve 504 represents the relationship between pressures and thickness for an aerodynamic film bearing 148 (and not an aerostatic film bearing 148). The stiffness of the film bearing 148 can be calculated or otherwise determined as the slope of the curve 500, 502, or 504 at the corresponding thickness of the film bearing 148.

For the case of an aerostatic film bearing 148 (e.g., the curve 500), the bearing pressure levels out at smaller film thicknesses, which means that the stiffness of the film bearing 148 is at or near zero at these small film thicknesses. Further reductions in film thickness might lead to negative stiffness. This leveling-off of the bearing pressure and loss of stiffness at small film thickness is undesirable.

A greater film stiffness is desired, especially at smaller operating film clearances to ensure successful tracking of the rotating component 106. For example, as the rotating component 106 undergoes axial out-of-plane motion (due to axial growth, high-speed run-out, etc.), the slide device 120 needs to faithfully track the rotating component 106 by overcoming the friction and slider inertia forces and moving back-and-forth axially as the rotating component 106 undergoes axial motion. Such high-speed tracking may not be possible with the aerostatic film bearing 148 alone (e.g., the curve 500).

One embodiment of the inventive subject matter described herein provides design features on the seal bearing face 140 that are aerodynamic force-generation features. These features can create a combined aerostatic and aerodynamic film bearing 148 and/or an aerodynamic film bearing 148. As shown in FIG. 5, the stiffnesses (e.g., slopes) of the curves 502, 504 created by these aerodynamic force-generation features increase at smaller thicknesses of the film bearing 148. This can help to ensure that the slide device 120 axially moves back-and-forth relative to or along the axial direction 116 as the rotating component 106 undergoes axial motion to prevent contact or rubbing between the seal bearing face 140 of the slide device 120 and the rotating component 106.

Figure 6:
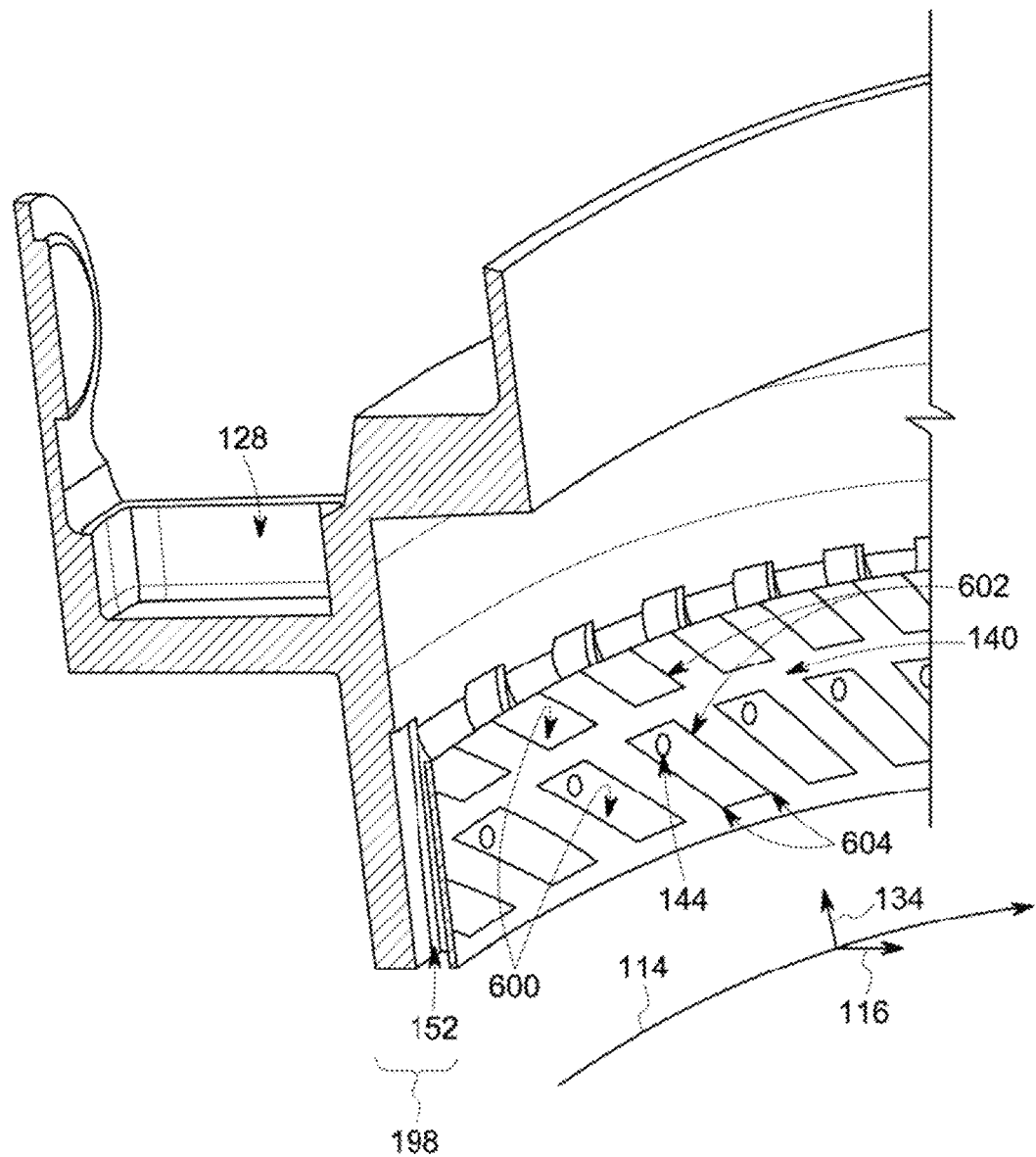
FIG. 6 illustrates one example of aerodynamic force-generation features on a seal bearing face of a slide device shown in FIG. 1.

FIG. 6 illustrates one example of aerodynamic force-generation features 600 on the seal bearing face 140 of the slide device 120. In one embodiment, the aerodynamic force-generation features 600 are grooves recessed into the seal bearing face 140. These features 600 extend into the seal bearing face 140 in directions that are opposite to the axial direction 116. These features 600 create a non-planar surface on the seal bearing face 140, as shown in FIG. 6.

At least some of the features 600 are positioned into the seal bearing face 140 such that the feed ports 144 extend through or into the features 600. Other features 600 may not include any feed ports 144 within the features 600. The open ends of the feed ports 144 are visible in FIG. 6 on the seal bearing face 140 and define the locations through which fluid flowing in the ports 142, 144 (shown in FIG. 1) reaches the space between the seal bearing face 140 and the rotating component 106. These open ends of the feed ports 144 are located within outer boundaries or edges 602 of some of the recessed features 600 such that the feed ports 144 direct fluid pressure to locations within the recessed features 600.

The outer edges 602 of the recessed features 600 represent the outer limits of the areas of the seal bearing face 140 that are recessed into the seal bearing face 140 in directions oriented away from the rotating component 106. The edges 602 for each recessed feature 600 intersect each other to form corners 604 of the recessed feature 600. In the illustrated embodiment, each recessed feature 600 that includes a feed port 144 has four intersecting edges 602 and four corners 604 formed by the intersecting edges 602. Optionally, a greater or fewer number of edges 602 and/or corners 604 can be formed. The edges 602 of the recessed features 600 shown in FIG. 6 form two acute angle corners 604 and two obtuse angle corners 604. The acute angle corners 604 have an angle subtended by the edges 602 forming the corner 604 that is less than ninety degrees. The obtuse angle corners 604 have an angle subtended by the edges 602 forming the corner 604 that is greater than ninety degrees. Alternatively, the features 600 may form corners 604 having other angles.

In the illustrated embodiment, the recessed features 600 are in the shape of elongated segments of a spiral groove. The illustrated spiral groove arrangement is a double spiral groove arrangement on the slide device 120. Similar spiral grooves can also be installed on the rotating component 106 along with feed ports 144 extending through the rotating component 106. For example, the recessed features 600 can be alternatively or additionally be provided on the surface of the rotating component 106 that faces the seal bearing face 140 with feed ports 144 extending axially through the rotating component 106 and having open ends within the recessed features 600. Other spiral groove arrangements including one row of spiral grooves (instead of the two rows shown in FIG. 6) also can be used.

The feed port 144 in a recessed feature 600 may be closer to one of the acute angle corners 604 than one or more (or all) other corners 604 of the same recessed feature 600. Alternatively, the feed port 144 may be in another location in the recessed feature 600. In operation, higher pressure fluid flowing through the ports 142, 144 exits from the feed ports 144 into the space between the seal bearing face 140 and the rotating component 106. At least part of this higher-pressure fluid can form one or more aerostatic portions of the film bearing 148 between the seal bearing face 140 and the rotating component 106 (even if the rotating component 106 is stationary with respect to the slide device 120 and the seal bearing face 140).

During rotation of the rotating component 106 in the rotational or circumferential direction 114 relative to the seal bearing face 140, at least some of this higher-pressure fluid exiting the feed ports 144 can enter one or more corners 604 formed by the edges 602 of the features 600. This portion of the fluid can be compressed into the acute angle corner 604 that is opposite of the acute angle corner 604 nearest the feed port 144. For example, at least some of the fluid flowing out of the feed port 144 in the upper left acute angle corner 604 of a recessed feature 600 in the perspective of FIG. 6 can be compressed into the other or opposite acute angle corner 604 in the same recessed feature 600 due to the rotation of the rotating component 106 in the circumferential direction 114. The compression of this portion of the fluid can form one or more aerodynamic portions of the film bearing 148 between the seal bearing face 140 and the rotating component 106. For example, the rotation of the rotating component 106 may squeeze or otherwise compress the fluid exiting the feed port 144 such that a larger thickness of the film bearing 148 at the feed port 144 (e.g., between the exit of the feed port 144 and the opposing rotating component 106) is compressed by the recessed feature 600 to a thinner film bearing 148 at or near the opposite corner 604 of the recessed feature 600. This can give rise or create aerodynamic forces that create the opening force $F_{opening}$.

Figure 7:
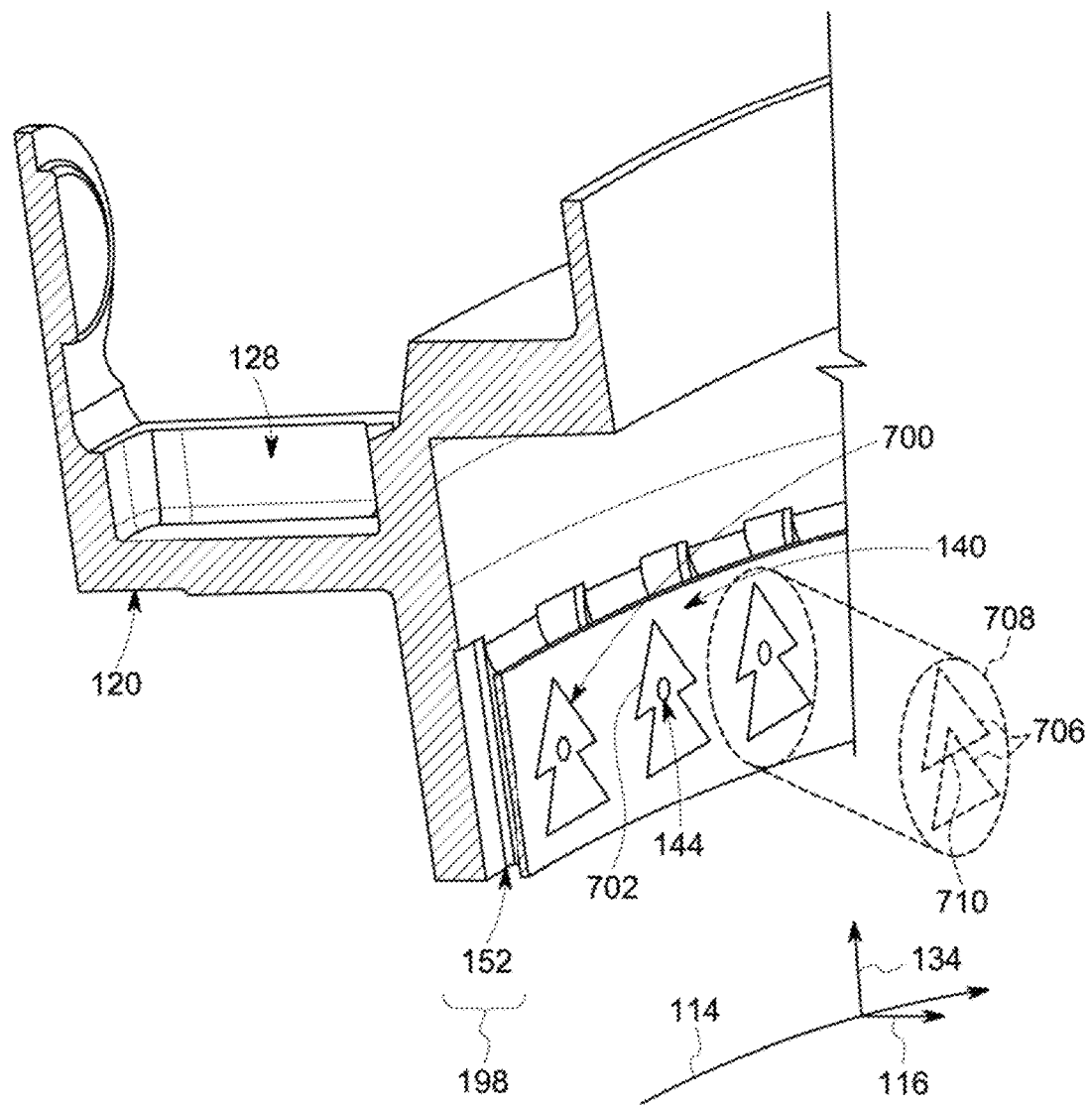
FIG. 7 illustrates another example of aerodynamic force-generation features on the seal bearing face of the slide device shown in FIG. 1.

FIG. 7 illustrates another example of aerodynamic force-generation features 700 on the seal bearing face 140 of the slide device 120. Similar to the features 600 shown in FIG. 6, the aerodynamic force-generation features 700 are grooves recessed into the seal bearing face 140. These features 700 extend into the seal bearing face 140 in directions that are opposite to the axial direction 116. These features 700 create a non-planar surface on the seal bearing face 140.

Similar to the recessed grooves 600, the recessed features 700 are polygon-shaped grooves defined by edges 702 that extend into the seal bearing face 140. For example, the recessed grooves 600, 700 are formed by intersecting linear edges 602, 702. Alternatively, one or more of the aerodynamic force-generation features described herein may have one or more curved or otherwise non-linear edges. In the illustrated example, the recessed features 700 are formed from two overlapping triangle-shaped recesses 706 as shown in an inset 708 of FIG. 7. The open end of a feed port 144 may be located within each or at least some of the recessed features 700. For example, the feed port 144 may be located in an area 710 where the triangle-shaped recesses 706 overlap each other. Optionally, the recessed features 700 can be formed from a single triangle-shaped recess 706, more than two triangle-shaped recessed 706, or one or more recesses in the shape of another polygon.

During rotation of the rotating component 106 in the rotational or circumferential direction 114 relative to the seal bearing face 140, at least some of this higher-pressure fluid exiting the feed ports 144 can enter one or more corners formed by the edges 702 of the features 700. The compression of the fluid can form one or more aerodynamic portions of the film bearing 148 between the seal bearing face 140 and the rotating component 106. For example, the rotation of the rotating component 106 may squeeze or otherwise compress the fluid exiting the feed port 144 such that a larger thickness of the film bearing 148 at the feed port 144 (e.g., between the exit of the feed port 144 and the opposing rotating component 106) is compressed by the recessed feature 700 to a thinner film bearing 148 at or near one or more corners of the recessed feature 700. This can give rise or create aerodynamic forces that create the opening force $F_{opening}$.

Figure 8:
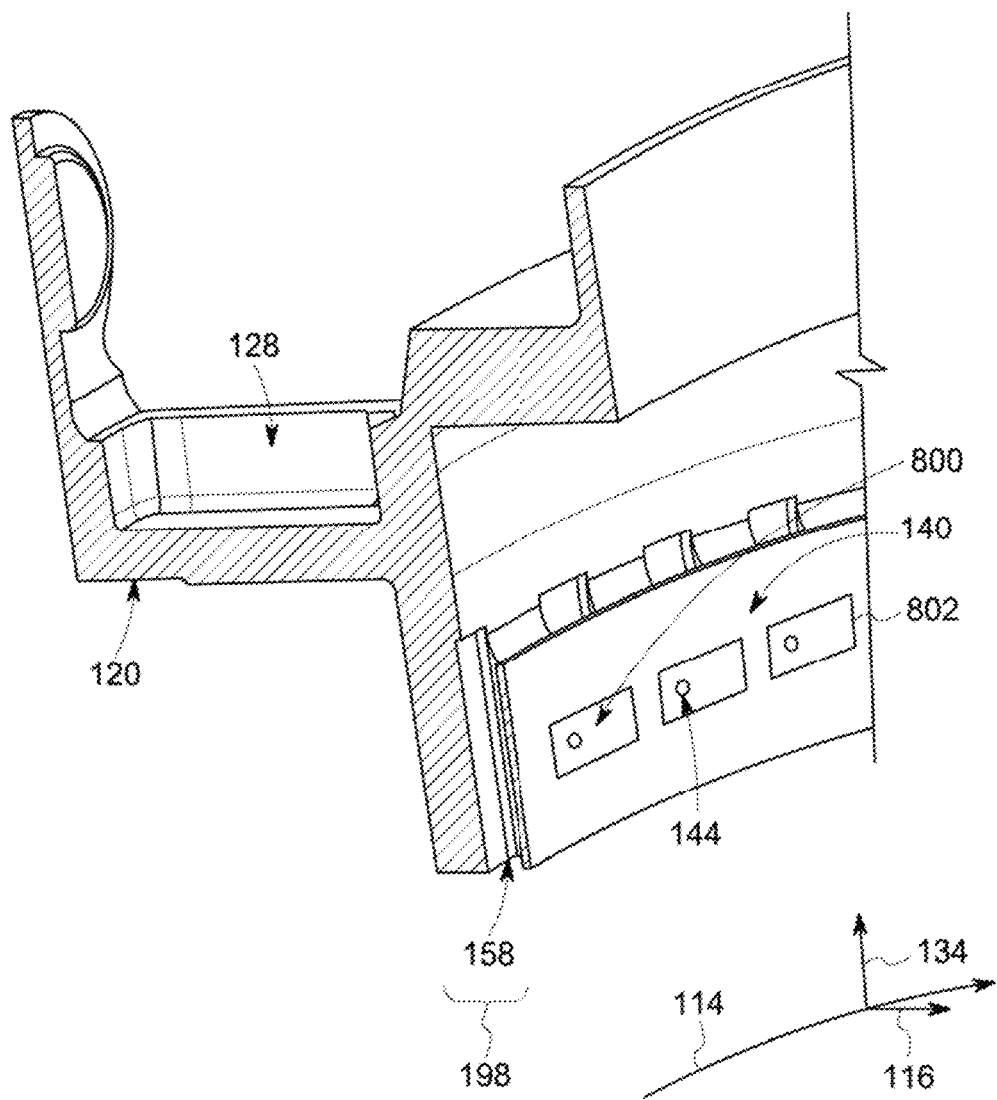
FIG. 8 illustrates another example of aerodynamic force-generation features on the seal bearing face of the slide device shown in FIG. 1.

FIG. 8 illustrates another example of aerodynamic force-generation features 800 on the seal bearing face 140 of the slide device 120. Similar to the features 600, 700 shown in FIGS. 6 and 7, the aerodynamic force-generation features 800 are grooves recessed into the seal bearing face 140. These features 800 extend into the seal bearing face 140 in directions that are opposite to the axial direction 116. These features 800 create a non-planar surface on the seal bearing face 140.

Similar to the recessed grooves 600, 700, the recessed features 800 are polygon-shaped grooves defined by edges 802 that extend into the seal bearing face 140. For example, the recessed grooves 800 are formed by linear edges 802 that intersect at corners. These features 800 optionally can be referred to as Rayleigh steps. Alternatively, one or more of the aerodynamic force-generation features described herein may have one or more curved or otherwise non-linear edges. In the illustrated example, each of the recessed features 800 is a rectangle that is elongated in a direction along or parallel to the circumferential direction 114. The open end of a feed port 144 may be located within each or at least some of the recessed features 800. Additionally or alternatively, the recessed features 800 and feed ports 144 can be located on or through the surface of the rotating component 106 that faces the seal bearing face 140.

In one embodiment, the entire recessed feature 800 may not be at a common depth from the surface of the seal bearing face 140. The feature 800 may be recessed from the seal bearing face 140 by a larger distance in locations that are adjacent to the opening of the feed port 144 but may be recessed by smaller distances in locations that are farther from the feed port 144. Alternatively, the depth of the recessed feature 800 (and/or one or more other features 600, 700) may be constant (e.g., within manufacturing tolerances).

During rotation of the rotating component 106 in the rotational or circumferential direction 114 relative to the seal bearing face 140, at least some of this higher-pressure fluid exiting the feed ports 144 can enter into one or more corners formed by the edges 802 of the features 800 and/or can be compressed against one edge 802 of each feature 800. For example, part of the fluid exiting a feed port 144 can be compressed against the radially-oriented edge 802 that is downstream of the feed port 144 in the same recessed feature 800 along the circumferential direction 114. In the perspective of FIG. 8, the fluid can be compressed by the radially-oriented edge 802 that is to the right of each feed port 144. The compression of the fluid can form one or more aerodynamic portions of the film bearing 148 between the seal bearing face 140 and the rotating component 106. For example, the rotation of the rotating component 106 may squeeze or otherwise compress the fluid exiting the feed port 144 such that a larger thickness of the film bearing 148 at the feed port 144 (e.g., between the exit of the feed port 144 and the opposing rotating component 106) is compressed by the recessed feature 800 to a thinner film bearing 148 at or near one or more corners of the recessed feature 800. This can give rise or create aerodynamic forces that create the opening force $F_{opening}$.

Figure 9:
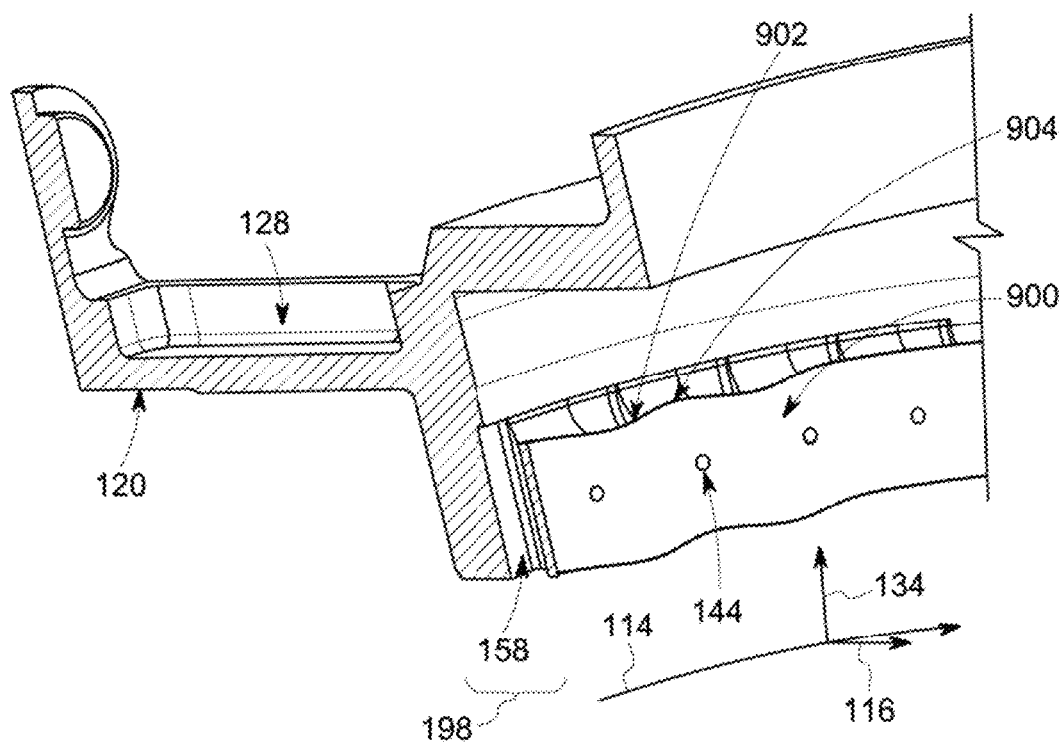
FIG. 9 illustrates another example of aerodynamic force-generation features on the seal bearing face of the slide device shown in FIG. 1.

FIG. 9 illustrates another example of aerodynamic force-generation features 900 on the seal bearing face 140 of the slide device 120. In contrast to the recessed features 600, 700, 800 shown in FIGS. 6 through 8, the features 900 are crests 902 and troughs 904 of an undulating surface. The undulating surface can be the seal bearing face 140 formed by the crests 902 and troughs 904. The crests 902 axially extend toward the rotating component 106 in directions oriented along the axial direction 116. The troughs 904 axially extend away from the rotating component 106 along opposite directions. While the undulating surface forming the aerodynamic force-generation features 900 is shown on the slide device 120, the undulating surface forming the aerodynamic force-generation features 900 additionally or alternatively may be on the surface of the rotating component 106 that faces the seal bearing face 140 of the slide device 120.

During rotation of the rotating component 106 in the rotational or circumferential direction 114 relative to the seal bearing face 140, at least some of this higher-pressure fluid exiting the feed ports 144 can be compressed by the crests 902 of the undulating surface of the seal bearing face 140. For example, part of the fluid exiting a feed port 144 can be compressed against the downstream crests 902 along the circumferential direction 114. The compression of the fluid can form one or more aerodynamic portions of the film bearing 148 between the seal bearing face 140 and the rotating component 106. For example, the rotation of the rotating component 106 may squeeze or otherwise compress the fluid exiting the feed port 144 such that a larger thickness of the film bearing 148 at the feed port 144 (e.g., between the exit of the feed port 144 and the opposing rotating component 106) is compressed by the crest 902 to a thinner film bearing 148. This can give rise or create aerodynamic forces that create the opening force $F_{opening}$.

The aerodynamic force-generating features 600, 700, 800, 900 described here introduce aerodynamic design features that create a hybrid aspirating face seal of the seal assembly 100 having both aerostatic feed ports 144 and aerodynamic features (e.g., corners, edges, and/or crests). Introduction of the aerodynamic features 600, 700, 800, 900 in addition to the aerostatic feed ports 144 can allow the bearing pressure to increase even for small thicknesses of the film bearing 148 (e.g., thicknesses that are smaller than 2 mils). This hybrid aspirating face seal bridges the two regimes of aerostatic operation (e.g., as represented by the stiffness curve 500 in FIG. 5) and the pure aerodynamic operation of smaller film thicknesses (e.g., as represented by the stiffness curve 504 in FIG. 5). The hybrid aspirating face seal can operate with a film thickness of the bearing 148 of less than 0.020 inch in one embodiment. Such a hybrid seal can operate at smaller film thicknesses (compared to a traditional aspirating face seal); thereby with reduced leakage past the primary tooth 136 but not too close to the rotating component 106 like a pure aerodynamic seal, which can be risky to operate at very small film thicknesses (especially risky for high-temperature, large diameter seals where such thin films are difficult to maintain both from a manufacturing perspective and a thermal and/or pressure operation perspective).

Figure 10:
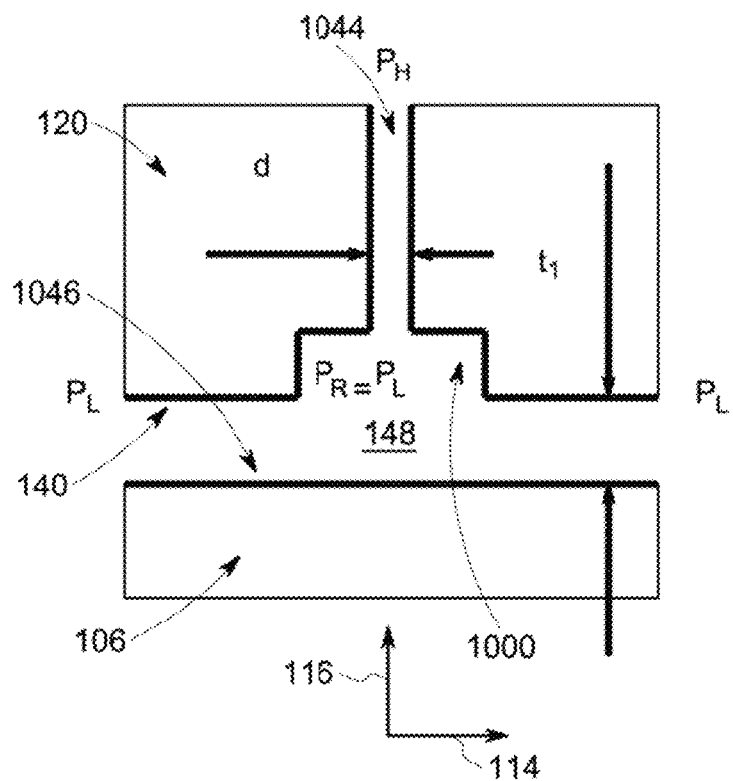
FIG. 10 illustrates one example of operation of feed ports having different diameters.
Figure 11:
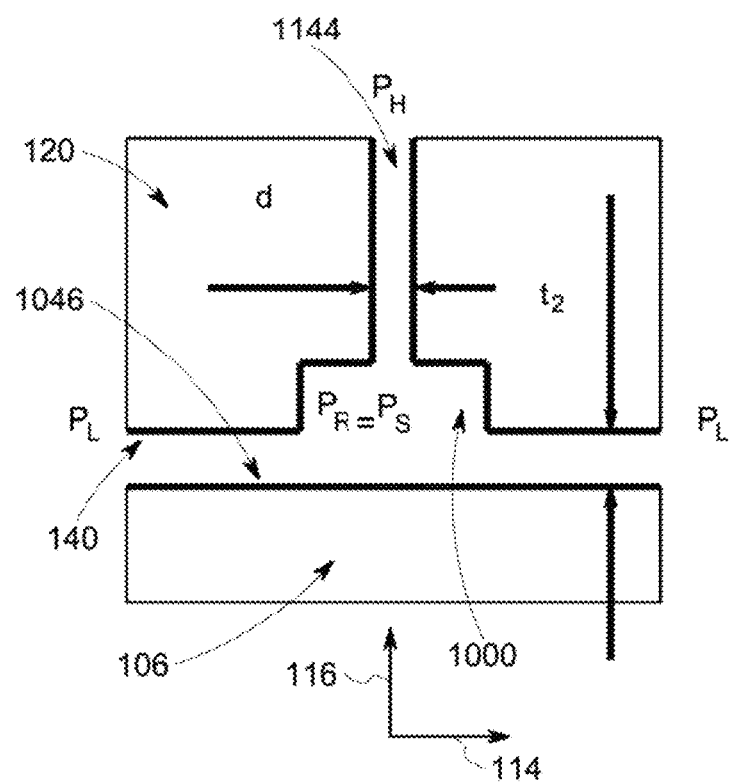
FIG. 11 illustrates another example of operation of feed ports having different diameters.

One factor that can impact the thickness of the film bearing 148 is the size of the feed ports 144 relative to the nominal, normalized, or average film thickness of the bearing 148. This size of a feed port 144 can be the inner diameter of the feed port 144 away from the intersection between the feed port 144 and the seal bearing face 140. FIGS. 10 and 11 illustrate one example of operation of feed ports 144 having different diameters. FIG. 10 illustrates a feed port 1044 of size $d_1$ feeding a counterbore recess 1000 in the seal bearing face 140. The feed port 1044 can represent one or more of the feed ports 144. The recess 1000 can represent one or more of the features 600, 700, 800 and/or a valley 904 described above, or can represent another recess in the seal bearing face 140. This feed port 1044 and recess 1000 are separated from an opposing surface 1046 of the rotating component 106 by a film bearing 148 having a film thickness of $t_1$. The film thickness $t_1$ is large compared to the size d of the feed port 1044. In this example, the pressure drop occurs from the higher fluid pressure $P_{high}$ ($P_H$ in FIG. 10) to the lower fluid pressure $P_{low}$ ($P_L$ in FIG. 10) across the feed port 1044 such that the recess pressure ($P_R$ in FIG. 10) is equal to the lower fluid pressure $P_L$.

FIG. 11 illustrates a feed port 1144 of a smaller size $d_2$ feeding the counterbore recess 1000 in the seal bearing face 140. The feed port 1144 can represent one or more of the feed ports 144. The thickness of the film bearing 148 in FIG. 11 is a smaller film thickness $t_2$. The film bearing 148 restricts the flow of fluid between the seal bearing face 140 and the rotating component 106 such that the recess pressure $P_R$ is a greater pressure $P_S$ (e.g., greater than the lower fluid pressure $P_L$). FIGS. 10 and 11 illustrate that smaller film thickness relative to a fixed feed port size) results in gradually increasing pressure on the rotating component 106.

Figure 12:
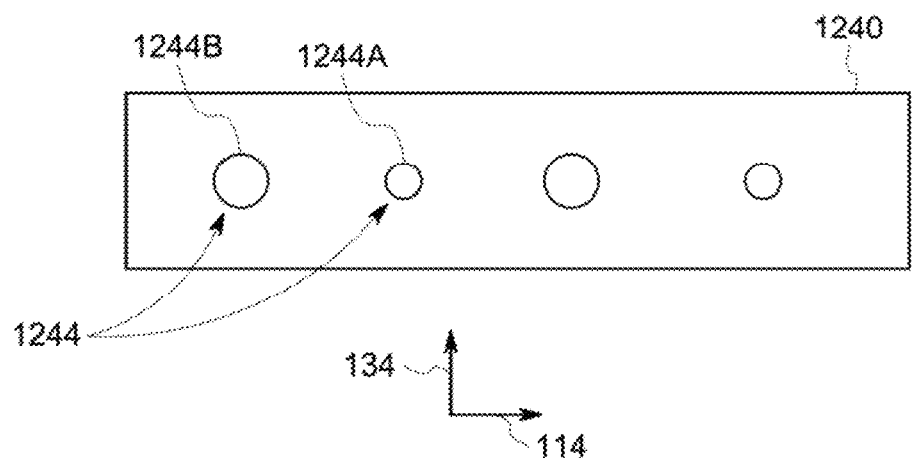
FIG. 12 illustrates one embodiment of a seal bearing face having feed ports of different sizes.

FIG. 12 illustrates one embodiment of a seal bearing face 1240 having feed ports 1244 of different sizes. The seal bearing face 1240 can represent one or more of the seal bearing faces 140 described herein. The seal bearing face 1240 includes feed ports 1244 that can represent the feed ports 144, 1044, 1144. The feed ports 1244 include the feed ports 1244A and the feed ports 1244B. As shown, the feed ports 1244A have smaller diameters $d_1$ than the diameters $d_2$ of the feed ports 1244B in the same seal bearing face 1240. While the feed ports 1244 are shown as circular openings or holes, alternatively, the feed ports 1244 may have another shape. The diameters shown in FIG. 12 optionally can be inside or internal dimensions, such as the size of the feed ports 1244 between opposing internal surfaces of the feed ports 1244. The feed ports 1244A, 1244B can be in an alternating arrangement along the circumferential direction 114. For example, a smaller feed port 1244A can be located between every two larger feed ports 1244B and a larger feed port 1244B can be located between every two smaller feed ports 1244A along the circumferential direction 114. Optionally, another arrangement can be provided. Additionally or alternatively, the feed ports 1244 may be provided in more than two different sizes. For example, the feed ports 1244 may have three or more different diameters with the feed ports 1244 in different locations and extending through the seal bearing face 1240.

Providing the seal bearing face 1240 with a variety of different sized feed ports 1244 can result in different feed ports 1244 being effective to form aerostatic forces for different thicknesses of the film bearing 148. For example, for larger thicknesses of the film bearing 148, the larger feed ports 1244B can be effective to form and maintain the film bearing 148, while the smaller feed ports 1244A are ineffective or significantly less effective. For smaller thicknesses of the film bearing 148, the smaller feed ports 1244A can be effective to form the aerostatic forces and maintain the film bearing 148, while the larger feed ports 1244B are inactive ineffective or significantly less effective. A feed port 1244 is effective while that feed port 1244 generates aerostatic force that is no smaller than 1% of the greatest aerostatic force that the feed port 1244 can generate at any gap distance for the same fluid pressure supplied to the feed port 1244. In one embodiment, the larger feed ports 1244B can be effective for film bearings 148 having larger thicknesses, while the smaller feed ports 1244A are effective for thinner film bearings 148.

Figure 13:
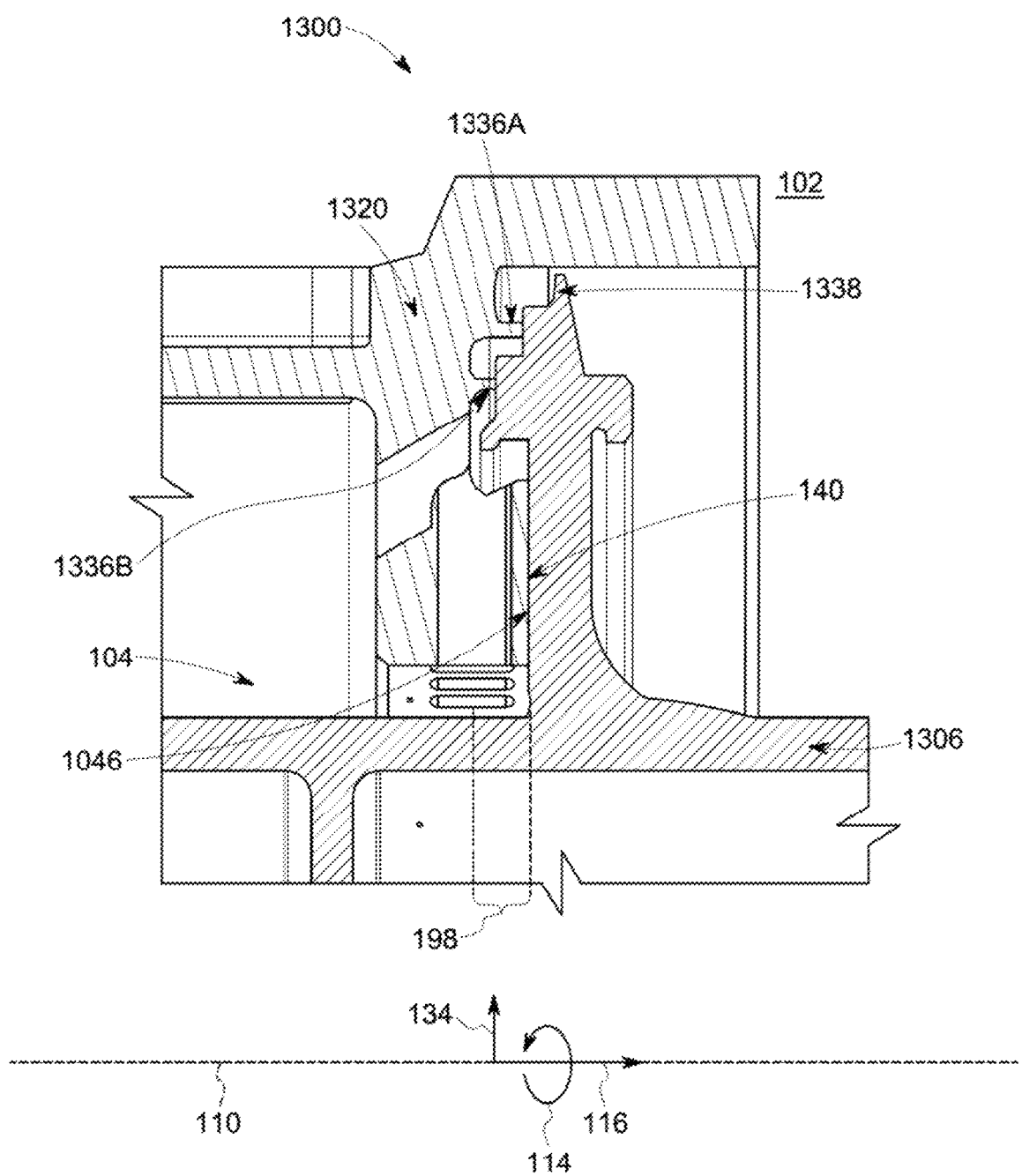
FIG. 13 illustrates a cross-sectional view of a slide device and a rotating component of another embodiment of a seal assembly.

The inventive seal assemblies described herein optionally can include the primary tooth 136 and/or starter tooth 138 in other arrangements and optionally can include additional features, as described below. FIG. 13 illustrates a cross-sectional view of a slide device 1320 and a rotating component 1306 of another embodiment of a seal assembly 1300. The seal assembly 1300 can represent the seal assembly 100 shown in FIG. 1. For example, the seal assembly 1300 can be positioned between a stationary component (e.g., a stator) and the rotating component 1306 (e.g., a rotor) of a rotary machine (e.g., a turbomachine) to reduce or prevent fluid leakage from a higher fluid pressure side or volume 102 of the rotary machine to a lower fluid pressure side or volume 104 of the rotary machine.

The slide device 1320 can be similar to the slide device 120 shown in FIG. 1 in that the slide device 1320 includes several of the same features as the slide device 120. The seal assembly 1300 differs from the seal assembly 100 shown in FIG. 1 in one or more ways. For example, the seal assembly 1300 includes one or more primary teeth 1336 on the slide device 1320 instead of on the rotating component 1306. Additionally, the seal assembly 1300 includes multiple primary teeth 1336A, 1336B instead of a single primary tooth 136. While the seal assembly 1300 includes two primary teeth 1336A, 1336B protruding from the slide device 1320, optionally, the seal assembly 1300 can include three or more primary teeth 1336A, 1336B protruding from the slide device 1320. Another difference is that a starter tooth 1338 is located on the rotating component 1306 (instead of on the slide device 120 as shown in FIG. 1).

The primary teeth 1336A, 1336B protrude from the slide device 1320 and are elongated in directions that are oriented along the axial direction 116 toward the rotating component 1306. One of the primary teeth 1336A projects farther along the axial direction 116 toward the rotating component 1306 than the other primary tooth 1336B in FIG. 13. For example, the primary tooth 1336A that is located radially outward of the other primary tooth 1336B along the radial direction 134 may project from the slide device 1320 farther along the axial direction 116 than the radially inward primary tooth 1336B. This farther projection of one primary tooth 1336A than the other primary tooth 1336B can be referred to as an axial offset of the primary teeth 1336. The axial offset causes the radially outward primary tooth 1336A to come closer to the rotating component 1306 prior to the radially inward primary tooth 1336B as the rotary machine is pressurized and the slide device 1320 moves in the axial direction 116 toward the opposing surface 1046 of the rotating component 1306.

The primary teeth 1336A, 1336B can be referred to as upstream or downstream teeth based on where the teeth are located relative to each other along the fluid leakage path 300 between the slider device and the rotating component (as shown in FIG. 3). In the embodiment shown in FIG. 13, the primary tooth 1336A can be referred to as the upstream primary tooth 1336A and the primary tooth 1336B can be referred to as the downstream primary tooth 1336B as the fluid flowing along the leakage path 300 from the higher pressure side or volume 102 to the lower pressure side or volume 104 will pass between the upstream primary tooth 1336A before passing by the downstream primary tooth 1336B.

Providing multiple primary teeth 1336A, 1336B on the slide device 1320 can reduce fluid leakage from the higher fluid pressure side or volume 102 to the lower fluid pressure side or volume 104. For example, the seal assembly 1300 may have reduced fluid leakage between the primary teeth 1336A, 1336B and the rotating component 1306 than the seal assembly 100 shown in FIG. 1 or other seal assemblies having fewer primary teeth. During pressurization of the rotary machine, the radially outward and farther projecting primary tooth 1336A can restrict the flow of fluid between the slide device 1320 and the rotating component 1306 before the radially inward primary tooth 1336B. This radially inward primary tooth 1336B can then further restrict the flow of fluid as the slide device 1320 moves toward and forms the film bearing 148 between the seal face 140 and the rotating component 1306.

Figure 14:
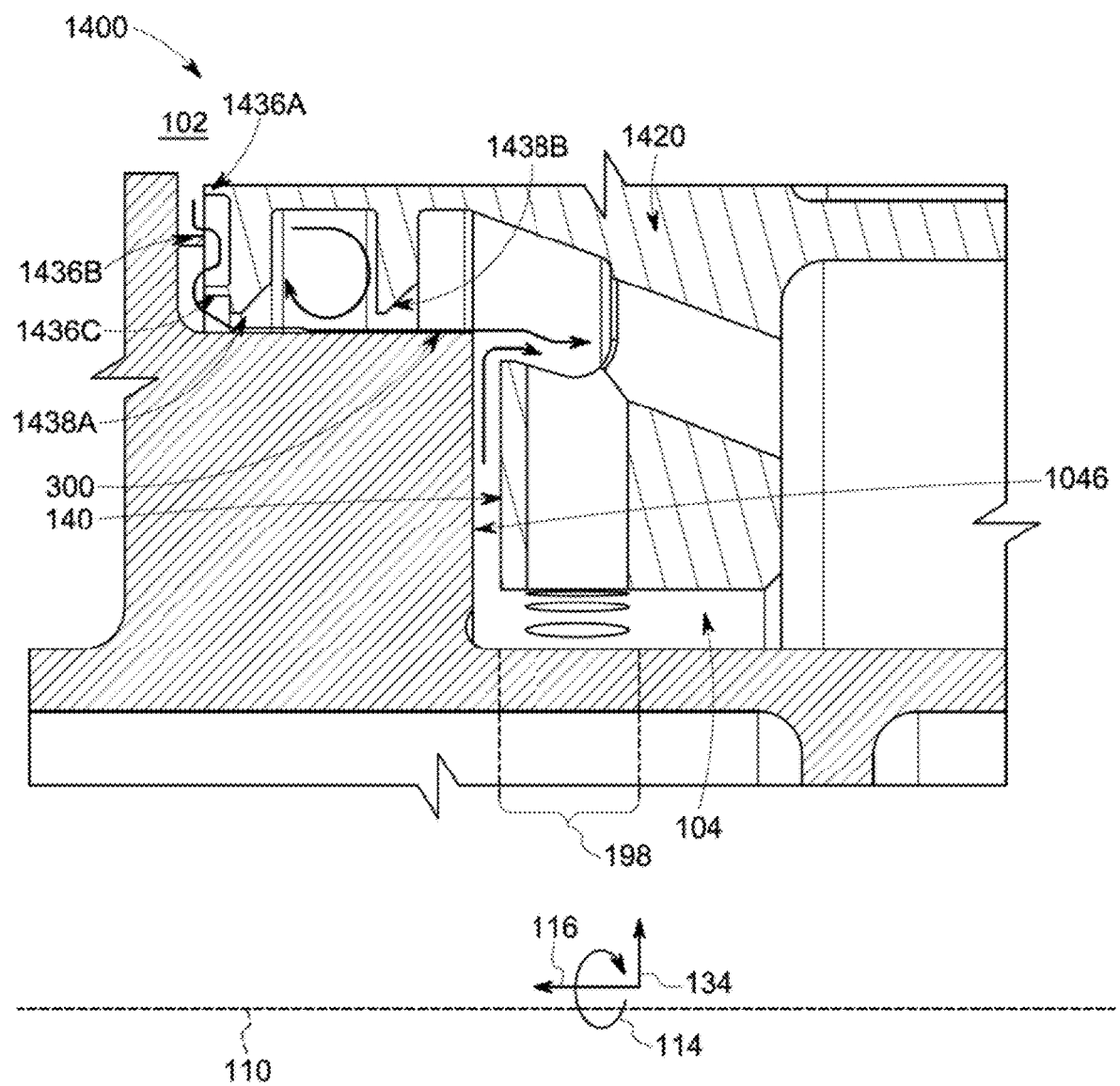
FIG. 14 illustrates a cross-sectional view of a slide device and a rotating component of another embodiment of a seal assembly.

FIG. 14 illustrates a cross-sectional view of a slide device 1420 and a rotating component 1406 of another embodiment of a seal assembly 1400. The seal assembly 1400 can represent the seal assembly 100 shown in FIG. 1. For example, the seal assembly 1400 can be positioned between a stationary component (e.g., a stator) and the rotating component 1406 (e.g., a rotor) of a rotary machine (e.g., a turbomachine) to reduce or prevent fluid leakage from a higher fluid pressure side or volume 102 of the rotary machine to a lower fluid pressure side or volume 104 of the rotary machine.

The slide device 1420 can be similar to the slide device 120 shown in FIG. 1 in that the slide device 1420 includes several of the same features as the slide device 120. The seal assembly 1400 differs from the seal assembly 100 shown in FIG. 1 in one or more ways. For example, each of the slide device 1420 and the rotating component 1406 in the seal assembly 1400 includes one or more primary teeth 1436A, 1436B, 1436C. The slide device 1420 includes two primary teeth 1436A, 1436C that project from the slide device 1420 and are elongated along the axial direction 116. The rotating component 1406 includes the primary tooth 1436B that projects from the rotating component 1406 and is elongated along a direction that is opposite the axial direction 116. In the illustrated embodiment, the primary tooth 1436B of the rotating component 1406 is located between the primary teeth 1436A, 1436C of the slide device 1420. For example, the primary tooth 1436A is radially outward of the primary teeth 1436B, 1436C, the primary tooth 1436B is radially outward of the primary tooth 1436C but radially inward of the primary tooth 1436A, and the primary tooth 1436C is radially inward of the primary teeth 1436A, 1436B. During rotation of the rotating component 1406, the primary tooth 1436B moves along the circumferential direction 114 between the primary teeth 1436A, 1436C of the slide device 1420. Alternatively, the rotating component 1406 may have the primary teeth 1436A, 1436C that are radially inside and radially outside of the primary tooth 1436B of the slide device 1420.

The seal assembly 1400 also includes multiple starter teeth 1438A, 1438B. In the illustrated embodiment, two starter teeth 1438A, 1438B are shown, but optionally, the seal assembly 1400 can include more starter teeth 1438A, 1438B. The starter teeth 1438A, 1438B radially project inward toward the axis of rotation 110 of the rotary machine. The starter teeth 1438A, 1438B project from the slide device 1420 toward the rotating component 1406. The starter teeth 1438A, 1438B can project from the slide device 1420 by the same amount such that all the starter teeth 1438A, 1438B are the same radial distance from the rotating component 1406.

The primary teeth 1436 and the starter teeth 1438 can be referred to as upstream and downstream based on locations of the teeth 1436, 1438 along the leakage path 300. For example, the primary tooth 1436A can be the upstream primary tooth 1436A as the primary tooth 1436A is upstream of the primary teeth 1436B, 1436C along the leakage path 300, the primary tooth 1436B can be a downstream primary tooth of the primary tooth 1436A and an upstream primary tooth of the primary tooth 1436C, and the primary tooth 1436C can be the downstream primary tooth 1436C. The starter tooth 1438A can be referred to as the upstream starter tooth 1438A and the starter tooth 1438B can be referred to as the downstream starter tooth 1438B.

The seal assembly 1400 can reduce fluid leakage from the higher-pressure side or volume 102 of the rotary machine to the lower pressure side or volume 104 of the rotary machine. The multiple primary teeth 1436A-C and multiple starter teeth 1438A-B create a tortuous fluid leakage path 300 (also shown in FIG. 3) that the fluid must flow to leak from the higher-pressure side 102 to the lower pressure side 104. This fluid leakage path 300 is made longer by the multiple teeth 1436A-C, 1438A-B relative to one or more of the teeth 1436A-C, 1438A-B not being present. This longer fluid leakage path 300 and the multiple seals formed by the multiple teeth 1436A-C, 1438A-B can reduce fluid leakage relative to one or more other seal assemblies.

Figure 15:
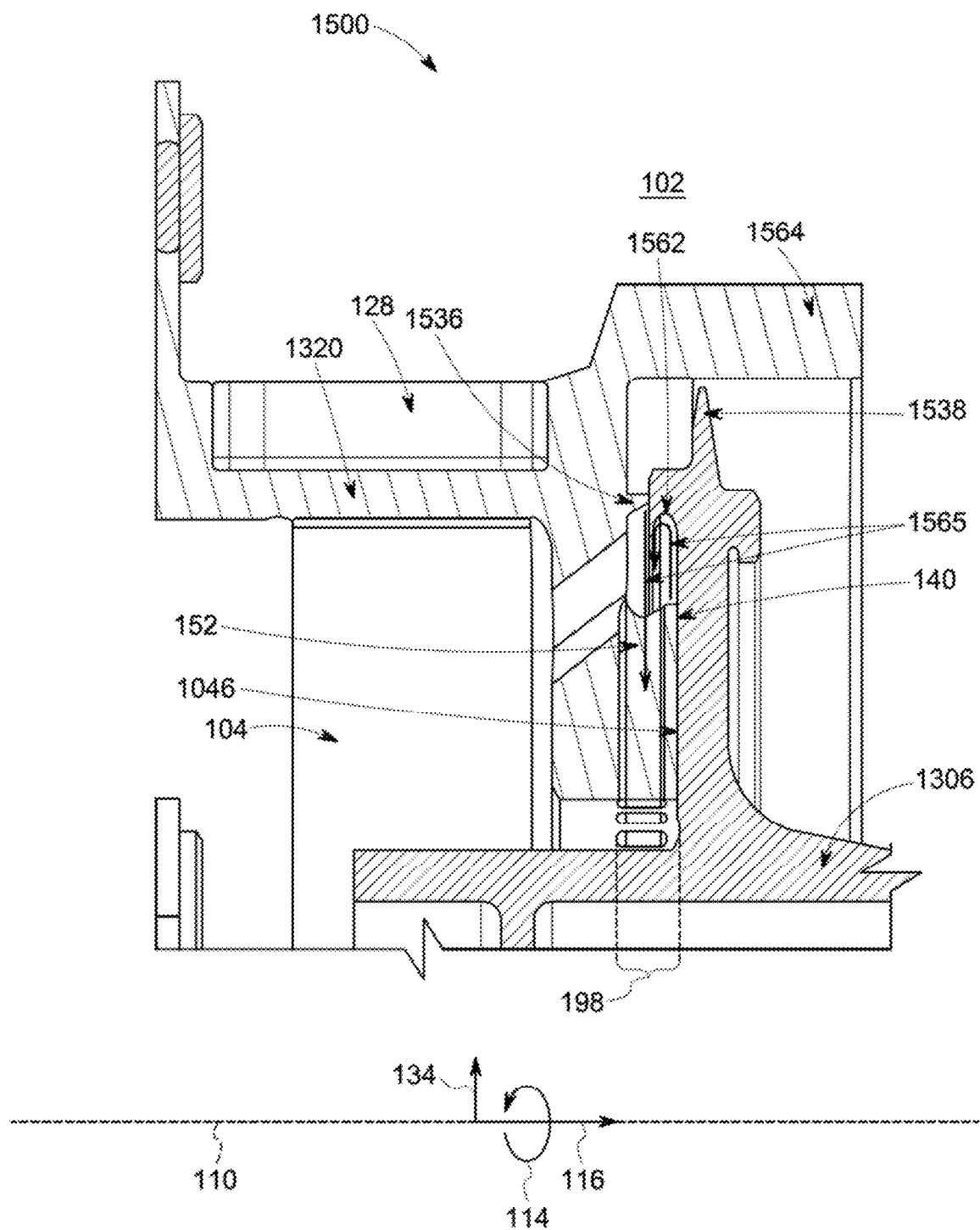
FIG. 15 illustrates a cross-sectional view of a slide device and a rotating component of another embodiment of a seal assembly.

FIG. 15 illustrates a cross-sectional view of a slide device 1520 and a rotating component 1506 of another embodiment of a seal assembly 1500. The seal assembly 1500 can represent the seal assembly 100 shown in FIG. 1. For example, the seal assembly 1500 can be positioned between a stationary component (e.g., a stator) and the rotating component 1506 (e.g., a rotor) of a rotary machine (e.g., a turbomachine) to reduce or prevent fluid leakage from a higher fluid pressure side or volume 102 of the rotary machine to a lower fluid pressure side or volume 104 of the rotary machine.

The slide device 1520 can be similar to the slide device 120 shown in FIG. 1 in that the slide device 1520 includes several of the same features as the slide device 120. The seal assembly 1500 differs from the seal assembly 100 shown in FIG. 1 in one or more ways. For example, the slide device 1520 includes a primary tooth 1536 that is elongated in the axial direction 116 and that projects from the slide device 1520 toward the rotating component 1506. The rotating component 1506 includes a starter tooth 1538 that projects radially outward from the rotating component 1506 toward an axially projecting portion 1564 of the slide device 1520. During pressurization of the rotary machine, the slide device 1520 moves in the axial direction 116 toward the rotating component 1506. The projecting portion 1564 moves over and in close proximity to the starter tooth 1538 such that the starter tooth 1538 begins restricting the flow of fluid from the higher-pressure side 102 to the lower pressure side 104. The slide device 1520 continues to move toward the rotating component 1506 and the primary tooth 1536 subsequently comes into close proximity to the rotating component to begin restricting the flow of fluid between the primary tooth 1536 and the rotating component 1506.

As shown in FIG. 15, the slide device 1520 includes the cross-over ports 152 described above. The rotating component 1506 includes a directional hooked tooth 1562 having curved surface that forms an inwardly curved hook. This directional hooked tooth 1562 is curved downward so that some fluid 1565 flowing in the space downstream of the primary tooth 1536 (e.g., between the primary tooth 1536 and the cross-over ports 152) can be directed into the cross-over ports 152. For example, the small amount of fluid 1565 flowing between the primary tooth 1536 and the rotating component 1506 may not all be directed into the cross-over port 152. The curved surface of the directional hooked tooth 1562 directs the fluid 1565 that is not flowing toward the port 152 back into the port 152, as shown in FIG. 15. This can prevent fluid pressure from building up over time in the space that is between (a) the interface between the primary tooth 1536 and the rotating component 1506 and (b) the cross-over port 152. A build-up of fluid pressure in this space can create additional opening forces ($F_{opening}$ as shown in FIG. 4) that can move the slide device 1520 away from the rotating component 1506 and increase the fluid leakage between the slide device 1520 and the rotating component 1506.

Figure 16:
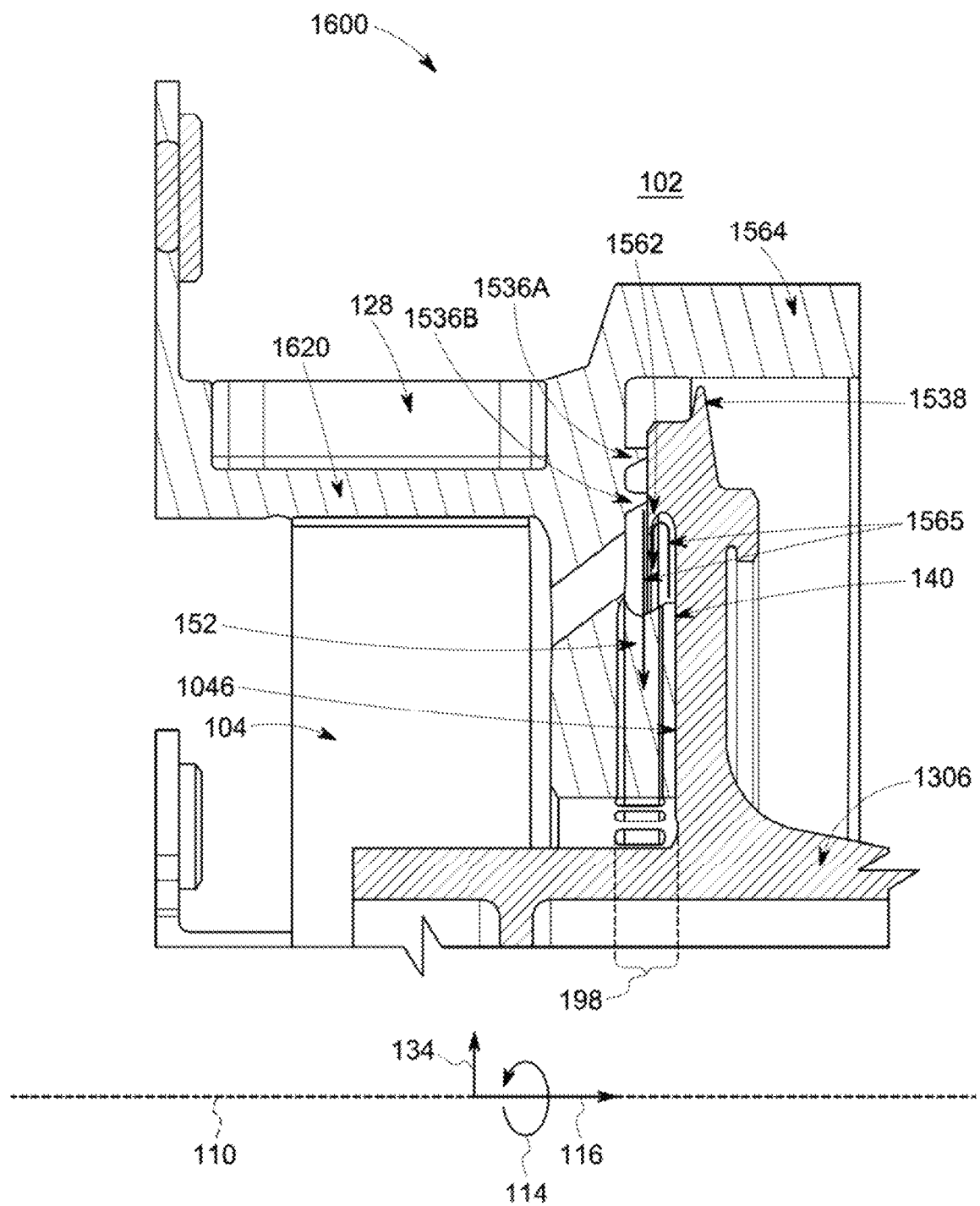
FIG. 16 illustrates a cross-sectional view of a slide device and a rotating component of another embodiment of a seal assembly.

FIG. 16 illustrates a cross-sectional view of a slide device 1620 and a rotating component 1606 of another embodiment of a seal assembly 1600. The seal assembly 1600 can represent the seal assembly 100 shown in FIG. 1. For example, the seal assembly 1600 can be positioned between a stationary component (e.g., a stator) and the rotating component 1506 of a rotary machine (e.g., a turbomachine) to reduce or prevent fluid leakage from a higher fluid pressure side or volume 102 of the rotary machine to a lower fluid pressure side or volume 104 of the rotary machine.

The slide device 1620 can be similar to the slide device 1520 shown in FIG. 15 except for the inclusion of multiple primary teeth 1536A, 1536B in the slide device 1620. While two primary teeth 1536A, 1536B are shown in FIG. 15, alternatively, more than two primary teeth 1536A, 1536B can be provided. Including multiple primary teeth 1536 (e.g., the teeth 1536A, 1536B) can reduce leakage of fluid from the higher-pressure side or volume 102 to the lower pressure side or volume relative to having fewer primary teeth 1536 or a single primary tooth 1536.

The rotating component 1606 optionally includes the curved surface that forms the inwardly curved hook 1562. This hook 1562 is curved downward to direct at least some of the fluid 1565 flowing in the space downstream of the primary teeth 1536 can be directed into the cross-over ports 152, as described above.

Figure 17:
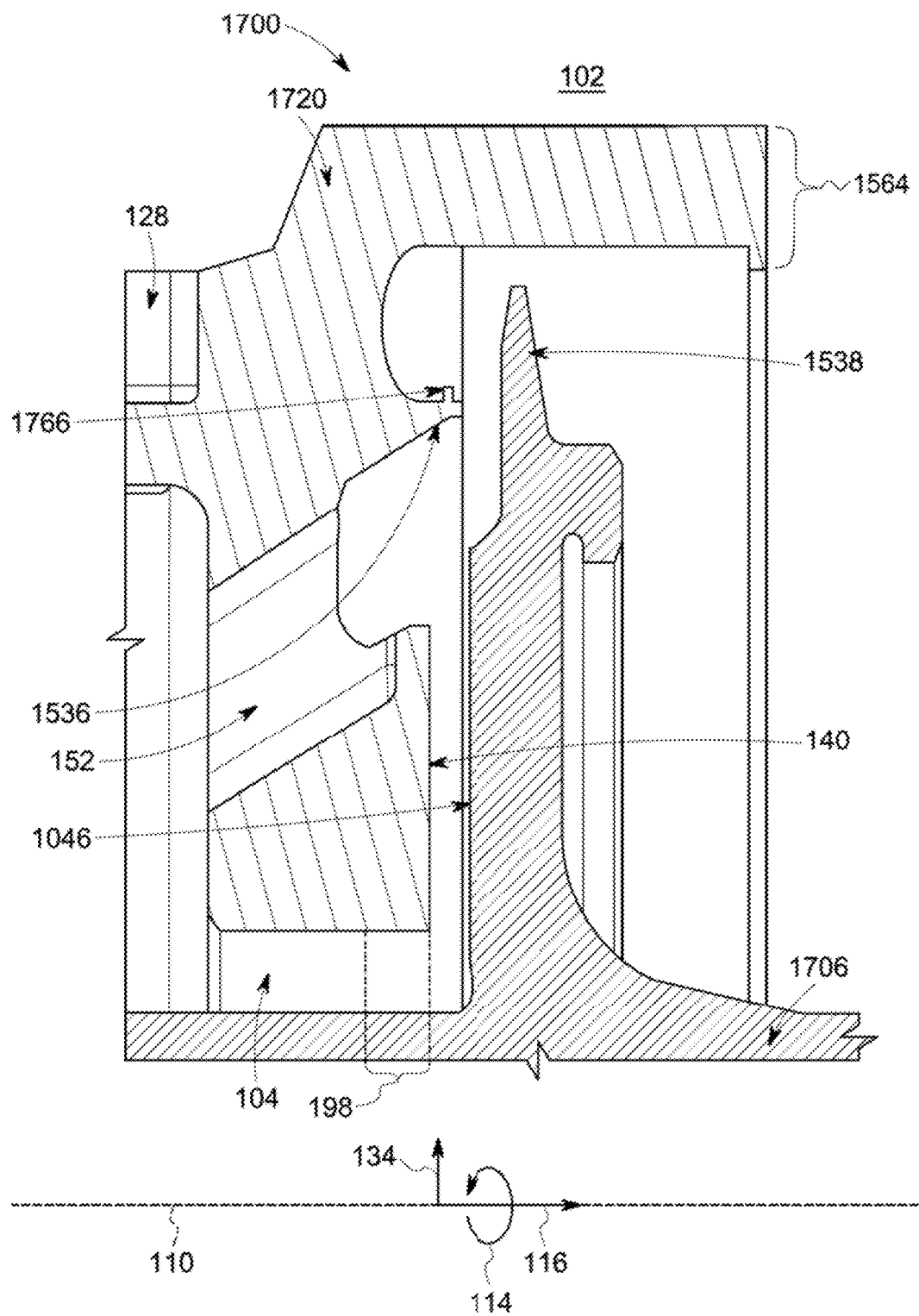
FIG. 17 illustrates a cross-sectional view of a slide device and a rotating component of another embodiment of a seal assembly.

FIG. 17 illustrates a cross-sectional view of a slide device 1720 and a rotating component 1706 of another embodiment of a seal assembly 1700. The seal assembly 1700 can represent the seal assembly 100 shown in FIG. 1. For example, the seal assembly 1700 can be positioned between a stationary component (e.g., a stator) and the rotating component 1706 (e.g., a rotor) of a rotary machine (e.g., a turbomachine) to reduce or prevent fluid leakage from a higher fluid pressure side or volume 102 of the rotary machine to a lower fluid pressure side or volume 104 of the rotary machine.

The slide device 1720 can be similar to the slide device 1520 shown in FIG. 15 in that the slide device 1720 includes several of the same features as the slide device 1520. One difference between the slide device 1720 and the slide device 1520 shown in FIG. 15 is the presence of a flow protuberance 1766. The flow protuberance 1766 is a projection that radially extends from the primary tooth 1536 along the radial direction 134. While the primary tooth 1536 is elongated along the axial direction 116 to form a fluid seal with the rotating component 1506, the flow protuberance 1766 radially projects from the primary tooth 1536 to introduce turbulent flow into fluid flowing along the fluid leakage path 300 upstream of the primary sealing tooth 1536. Without the flow protuberance 1766, at least some of the fluid that flows along the leakage path 300 between the starter tooth 1538 and the axially projecting portion 1564 may more easily flow in a more uniform direction to the space between the primary tooth 1536 and the rotating component 1506.

The flow protuberance 1766 interrupts this more uniform flow of the leaking fluid and creates less uniform flow of this fluid in the space between (a) an interface between the starter tooth 1538 and the axially projecting portion 1564 of the slide device 1720 and (b) an interface between the primary tooth 1536 and the rotating component 1506. Disrupting the more uniform flow of the leaking fluid in this space can reduce the momentum of the fluid moving to the location between the primary tooth 1536 and the rotating component 1506 and, in doing so, reduce the amount of fluid leaking between the primary tooth 1536 and the rotating component 1506 (relative to not having the flow protuberance 1766).

Figure 18:
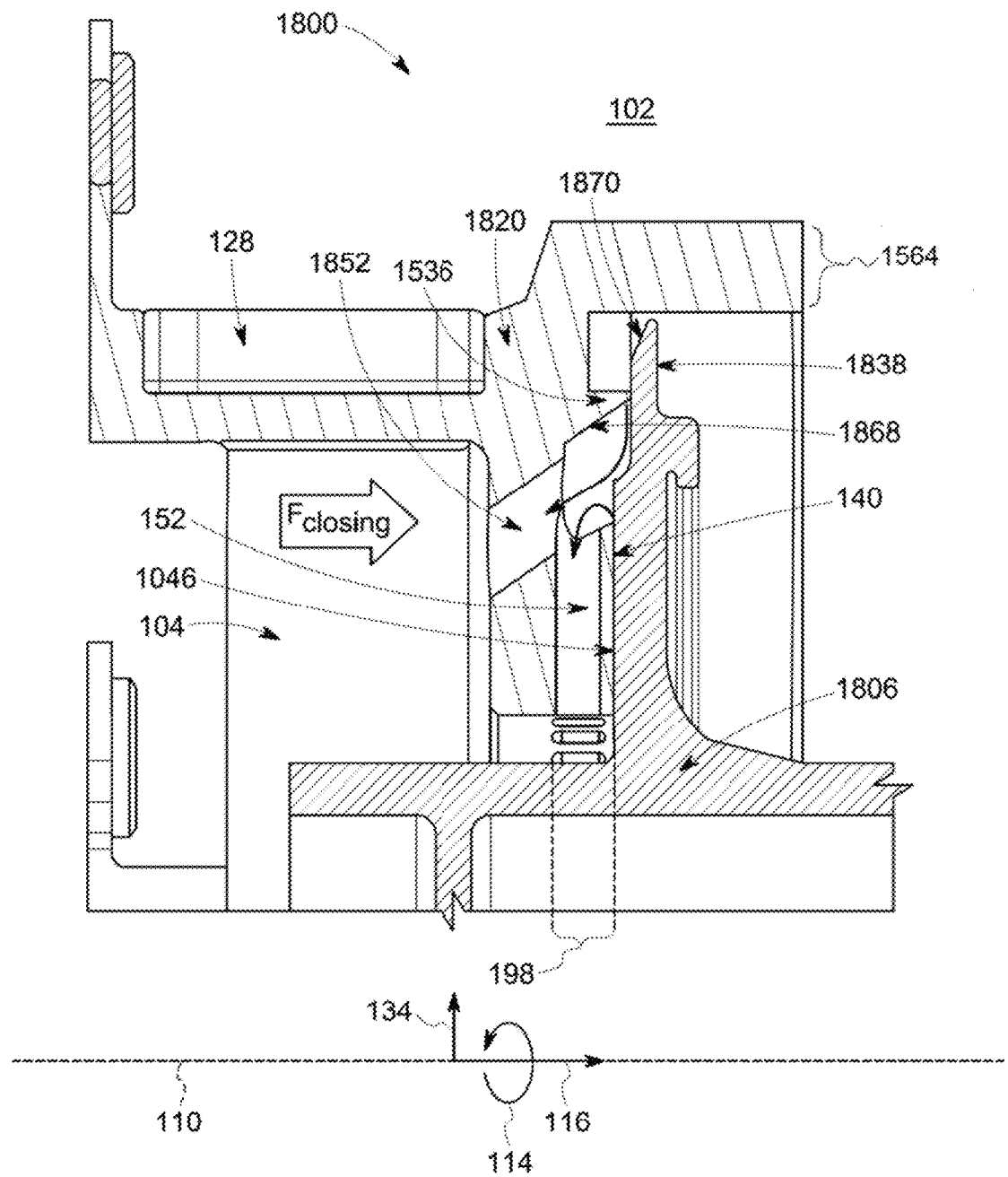
FIG. 18 illustrates a cross-sectional view of a slide device and a rotating component of another embodiment of a seal assembly.

FIG. 18 illustrates a cross-sectional view of a slide device 1820 and a rotating component 1806 of another embodiment of a seal assembly 1800. The seal assembly 1800 can represent the seal assembly 100 shown in FIG. 1. For example, the seal assembly 1800 can be positioned between a stationary component (e.g., a stator) and a rotating component 1806 (e.g., a rotor) of a rotary machine (e.g., a turbomachine) to reduce or prevent fluid leakage from a higher fluid pressure side or volume 102 of the rotary machine to a lower fluid pressure side or volume 104 of the rotary machine.

The slide device 1820 can be similar to the slide device 1720 shown in FIG. 17 in that the slide device 1820 includes several of the same features as the slide device 1720. The slide device 1820 has the primary sealing tooth 1536 shown in FIGS. 15 and 17 but does not include the flow protuberance 1766 shown in FIG. 17. In FIG. 18, the primary tooth 1536 of the slide device 1820 includes a slanted radially inward surface 1868. This slanted surface 1868 is oriented at an acute angle relative to the axial direction 116 in the illustrated cross-sectional view. Because the slide device 1820 may circumferentially extend around and encircle the axis of rotation 110, the slanted surface 1868 can form the shape of a cone or part of a cone that is centered or symmetric around the axis of rotation 110.

Additionally, the slide device 1820 includes the radially oriented cross-over ports 152 as well as slanted cross-over ports 1852. The cross-over ports 152 are channels along the radial directions 134 while the slanted cross-over ports 1852 are channels oriented along directions that are at acute angles with respect to the axis of rotation 110. Both the cross-over ports 152, 1852 fluidly couple the space that is downstream of the slanted primary tooth 1536 and upstream of the seal bearing face 140 with the lower pressure side or volume 104. These ports 152, 1852 allow for at least some of the low-pressure fluid in this space to flow to the lower pressure side or volume 104.

The slanted surface 1868 on the primary tooth 1536 helps to direct at least some of the fluid in this space into the ports 152, 1852. Without the slanted surface 1868 being present, more fluid (that leaks from the higher-pressure side 102 across the interface between the primary tooth 1536 and the rotating component 1806) would remain in this space. With the slanted surface 1868, more of this fluid is directed into the ports 152, 1852 so that pressure of this fluid does not build up and interfere with (e.g., weaken) the film bearing 148 between the seal bearing face 140 and the rotating component 1806.

Additionally, the rotating component 1806 includes a starter tooth 1838 that is elongated in the radial direction 134 toward the axially protruding portion 1564 of the slide device 1820. This starter tooth 1838 also includes a slanted surface 1870 that is angled against the flow of fluid from the higher-pressure side 102 to the lower pressure side 104. For example, the slanted surface 1870 can be angled against the direction in which fluid flows in the leakage path 300 such that the surface 1870 is oriented at an acute angle with respect to the axis of rotation 110. This slanted surface 1870 can assist in improving the pressure drop across the interface between the starter tooth 1838 and the slide device 1820. For example, less fluid may leak between the starter tooth 1838 having the slanted surface 1870 and the slide device 1820 compared to the starter tooth 1838 not having the slanted surface 1870.

Figure 19:
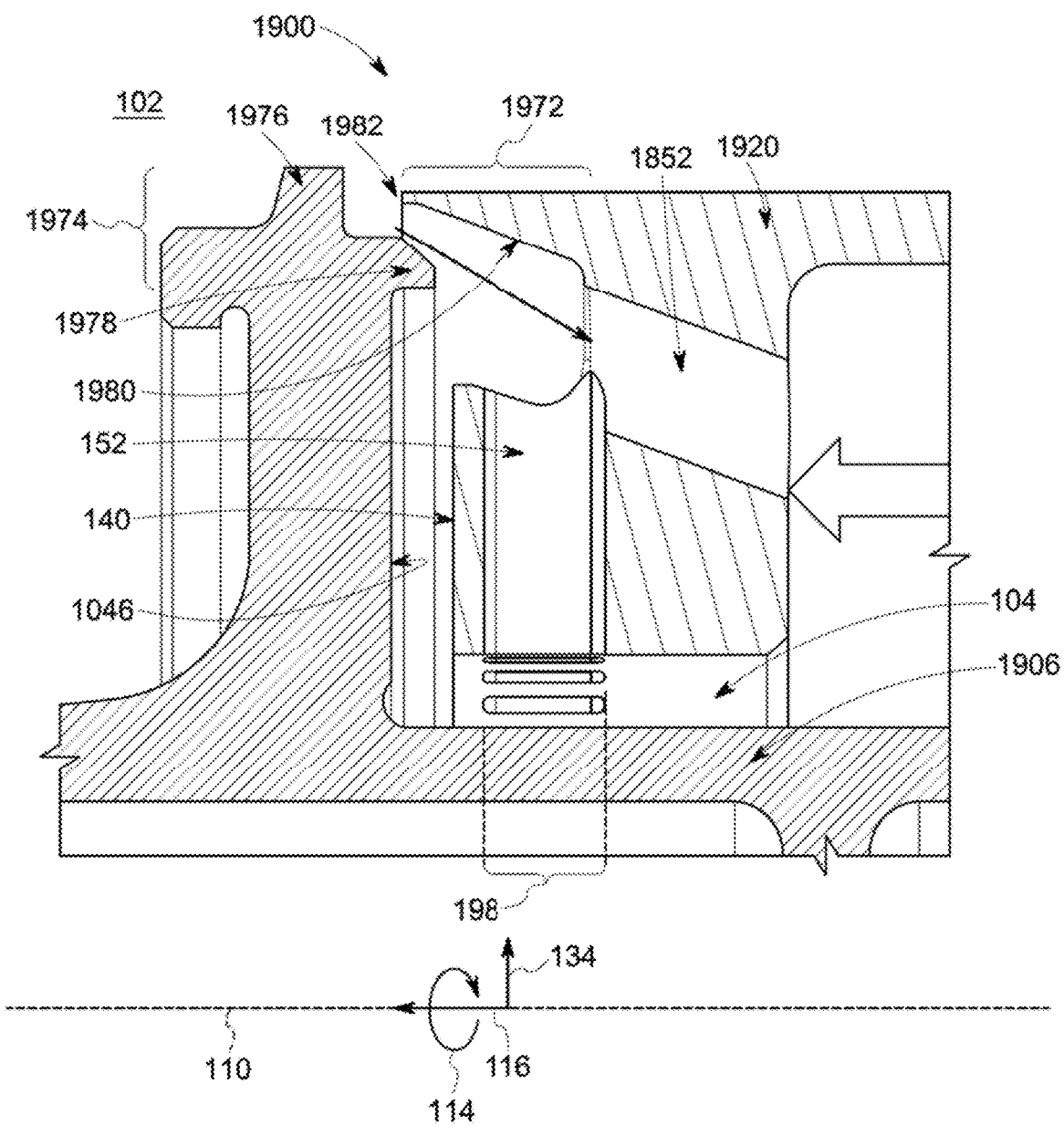
FIG. 19 illustrates a cross-sectional view of a slide device and a rotating component of another embodiment of a seal assembly.

FIG. 19 illustrates a cross-sectional view of a slide device 1920 and a rotating component 1906 of another embodiment of a seal assembly 1900. The seal assembly 1900 can represent the seal assembly 100 shown in FIG. 1. For example, the seal assembly 1900 can be positioned between a stationary component (e.g., a stator) and a rotating component 1906 (e.g., a rotor) of a rotary machine (e.g., a turbomachine) to reduce or prevent fluid leakage from a higher fluid pressure side or volume 102 of the rotary machine to a lower fluid pressure side or volume 104 of the rotary machine.

The slide device 1920 differs from other slider devices described herein in that the slide device 1920 includes a hybrid sealing tooth 1972. The hybrid sealing tooth 1972 is a combination of a primary sealing tooth and a starter sealing tooth as described herein. The hybrid sealing tooth 1972 includes a radially inward slanted surface 1980 that extends to an outer end 1982 of the tooth 1972. This surface 1980 is oriented at an acute angle to the axis of rotation 110.

The hybrid sealing tooth 1972 projects from the slide device 1920 along the axial direction 116 toward a step 1974 formed in the rotating component 1906. This step 1974 can be formed as a collar of the rotating component 1906 that radially protrudes outward from the rotating component 1906. The step 1974 forms a radial projecting portion 1976 and an axial projecting portion 1978. The radial projecting portion 1976 extends out from the rotating component 1906 along the radial direction 134 shown in FIG. 19 while the axial projecting portion 1978 extends out from the rotating component 1906 in a direction that is opposite to the axial direction 116 shown in FIG. 19.

In operation, as the rotary machine is pressurized, the higher-pressure side or volume 102 applies the closing force ($F_{closing}$ in FIG. 4) on the slide device 1920 to move the slide device 1920 toward the rotating component 1906. This force also moves the hybrid sealing tooth 1972 toward the step 1974 formed in the rotating component 1906. The step 1974 and the hybrid sealing tooth 1972 are shaped so that the space between the slide device 1920 and the rotating component 1906 is first restricted (e.g., reduced to a smaller opening) between the radially inward slanted surface 1980 and the axial projecting portion 1978 of the rotating component 1906. For example, the slanted surface 1980 of the hybrid tooth 1972 comes closer to the axial projecting portion 1978 of the rotating component 1906 than the end 1982 of the hybrid tooth 1972 comes to either portion 1976, 1978 of the step 1974. This can begin restricting the flow of fluid from the higher-pressure side or volume 102 to the lower pressure side or volume 104 between the rotating component 1906 and the slide device 1920.

The slide device 1920 can continue moving toward the rotating component 1906 and the space between the slanted surface 1980 and the axial projecting portion 1978 of the step 1974 can continue to decrease until the outer end 1982 of the hybrid tooth 1972 comes close enough to the radial projecting portion 1976 to form a film seal between the outer end 1982 and the radial projecting portion 1976. This operation of the hybrid tooth 1972 is similar to a combination of a starter tooth and a primary tooth described herein in that the hybrid tooth 1972 first forms a fluid flow restriction between the slanted surface 1980 and the rotating component 1906 (similar to operation of a starter tooth in one or more other embodiments) and subsequently forms a fluid seal or bearing between the outer end 1982 and the rotating component 1906 (similar to operation of a primary tooth in one or more other embodiments).

Figure 20:
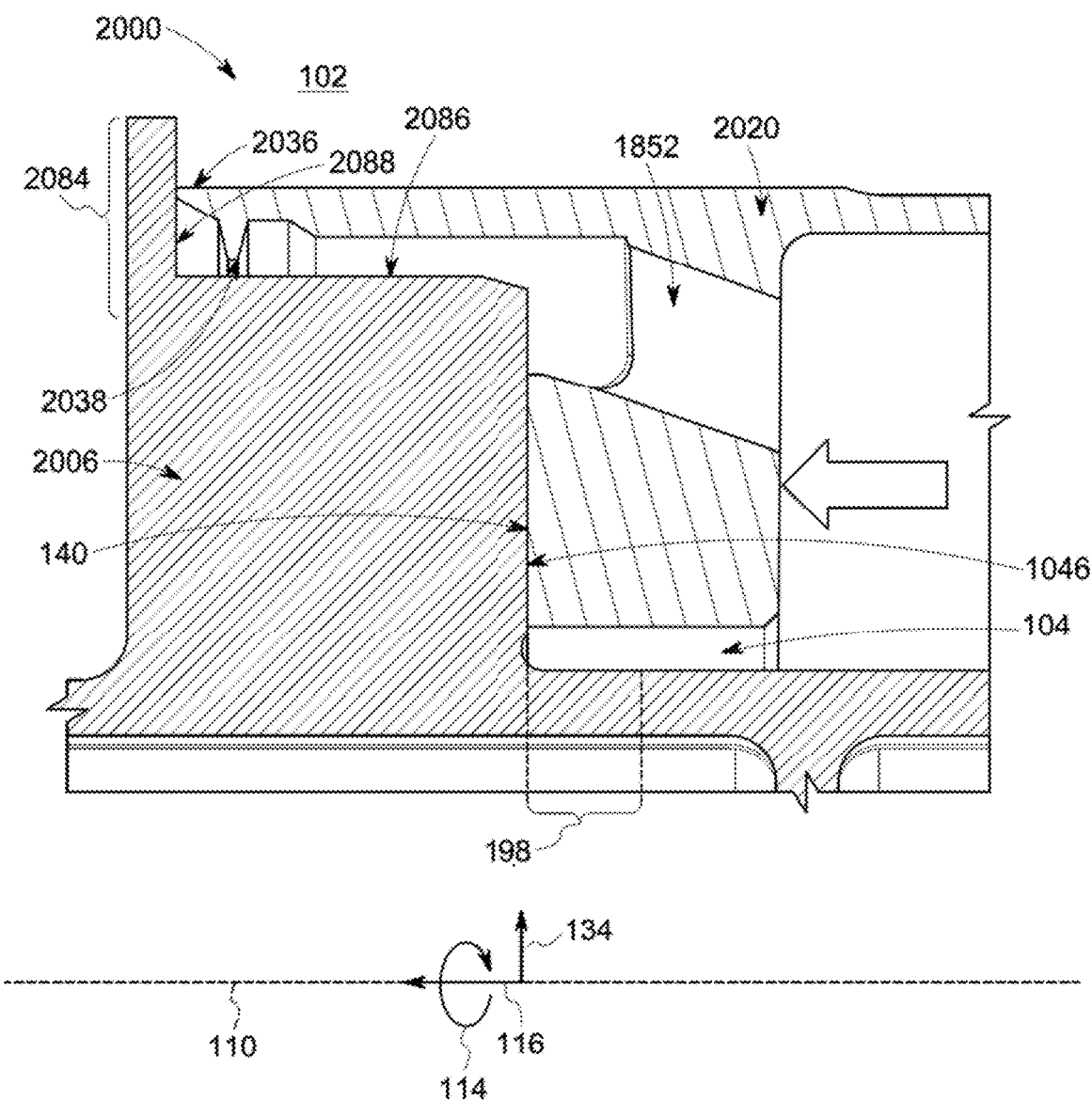
FIG. 20 illustrates a cross-sectional view of a slide device and a rotating component of another embodiment of a seal assembly.

FIG. 20 illustrates a cross-sectional view of a slide device 2020 and a rotating component 2006 of another embodiment of a seal assembly 2000. The seal assembly 2000 can represent the seal assembly 100 shown in FIG. 1. For example, the seal assembly 2000 can be positioned between a stationary component (e.g., a stator) and a rotating component 2006 (e.g., a rotor) of a rotary machine (e.g., a turbomachine) to reduce or prevent fluid leakage from a higher fluid pressure side or volume 102 of the rotary machine to a lower fluid pressure side or volume 104 of the rotary machine.

Like the slide device 1420 shown in FIG. 14, the slide device 2020 includes both an upstream primary sealing tooth 2036 and a downstream starter sealing tooth 2038. The starter tooth 2038 radially projects inwardly toward the axis of rotation 110 and the primary tooth 2036 axially projects along the axial direction 116. The rotating component 2006 includes a step 2084 having an outer radial surface 2086 that faces away from the axis of rotation 110 and an axial surface 2088 that faces the slide device 2020 (e.g., faces the seal bearing face 140 of the slide device 2020).

In operation, the closing forces $F_{closing}$ imparted on the slide device 2020 by the higher-pressure side or volume 102 in the rotary machine moves the slide device 2020 toward the rotating component 2006. The downstream starter tooth 2038 first comes into close proximity with the radial surface 2086 of the rotating component 2006 to reduce the flow of fluid between the slide device 2020 and the rotating component 2006. Continued movement of the slide device 2020 causes the outer end of the primary tooth 2036 to come close to the axial surface 2088 and form a fluid bearing or seal between the primary tooth 2036 and the rotating component 2006, as described herein. This first reduction of the leakage path 300 by the downstream starter tooth 2038 and subsequent formation of a film bearing or seal by the upstream primary tooth 2036 can reduce the leakage of fluid from the higher-pressure side 102 to the lower pressure side 104 along the leakage path 300 between the rotating component 2006 and the slide device 2020.

Figure 21:
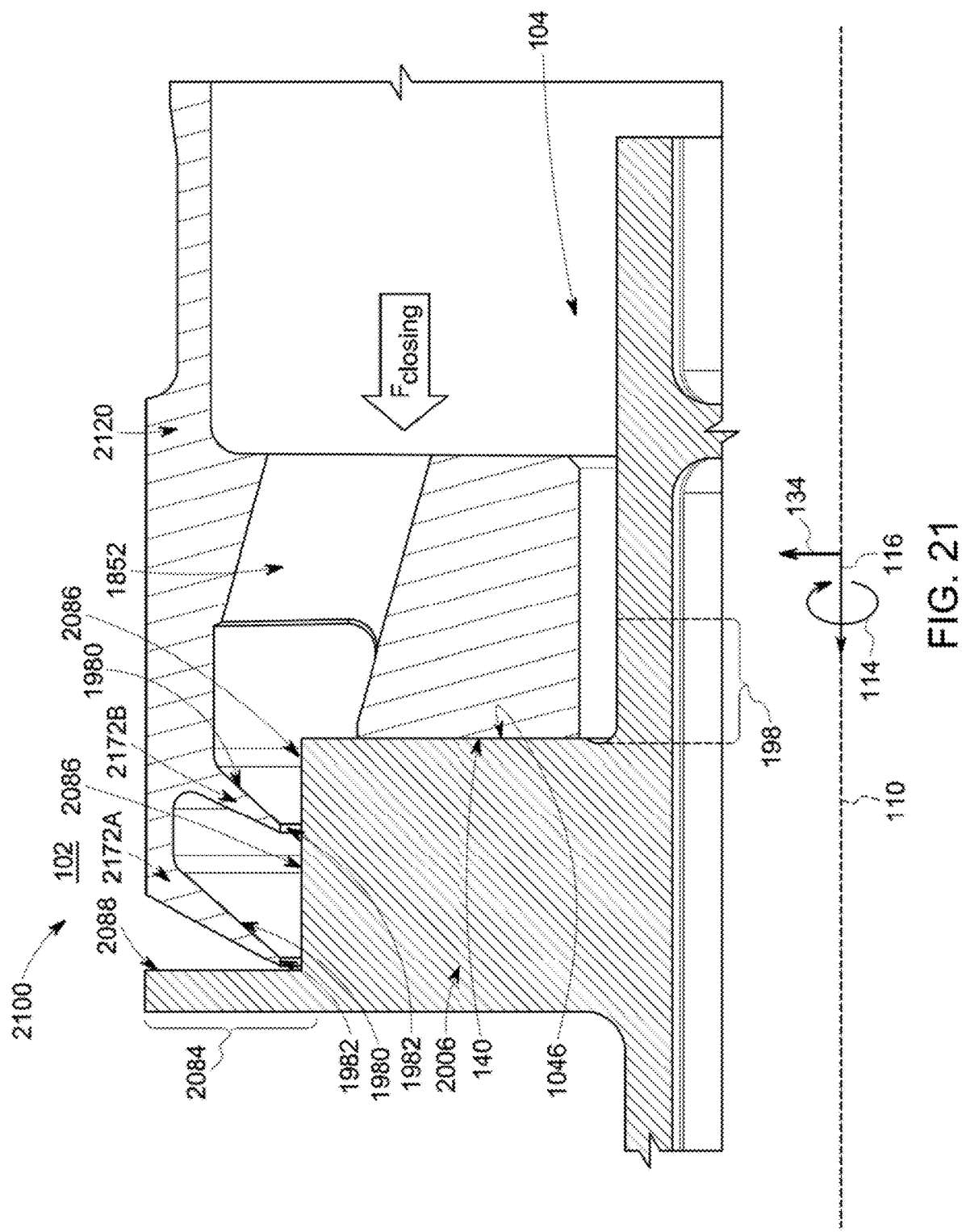
FIG. 21 illustrates a cross-sectional view of a slide device and a rotating component of another embodiment of a seal assembly.

FIG. 21 illustrates a cross-sectional view of a slide device 2120 and the rotating component 2006 of another embodiment of a seal assembly 2100. The seal assembly 2100 can represent the seal assembly 100 shown in FIG. 1. For example, the seal assembly 2100 can be positioned between a stationary component (e.g., a stator) and a rotating component 2006 (e.g., a rotor) of a rotary machine (e.g., a turbomachine) to reduce or prevent fluid leakage from a higher fluid pressure side or volume 102 of the rotary machine to a lower fluid pressure side or volume 104 of the rotary machine.

Like the slide device 1920 shown in FIG. 19, the slide device 2120 includes hybrid sealing teeth 2172 (e.g., hybrid teeth 2172A, 2172B). Each of the hybrid sealing teeth 2172A, 2172B is shaped to perform the functions of a starter sealing tooth and a primary sealing tooth. Each of the hybrid sealing teeth 2172A, 2172B includes the slanted surface 1980 that is oriented at an acute angle with respect to the axis of rotation 110. Each of the hybrid teeth 2172A, 2172B extends to a different outer end 1982. In contrast to the hybrid tooth 1972 shown in FIG. 19, the hybrid teeth 2172A, 2172B are elongated in directions that are oriented at an acute angle with respect to the axis of rotation 110. For example, the hybrid tooth 1972 is elongated along a direction that is parallel to the axis of rotation 110 and that is along the axial direction 116, while the hybrid teeth 2172A, 2172B are elongated in directions that are angled inward toward the axis of rotation 110. For example, the hybrid teeth 2172A, 2172B are elongated in directions that are between the axial and radial directions 116, 134. In the illustrated embodiment, the upstream hybrid tooth 2172A extends farther toward the axis of rotation 110 than the downstream hybrid tooth 2172B such that the outer end 1982 of the upstream hybrid tooth 2172A is closer to the axis of rotation 110 than the outer end 1982 of the downstream hybrid tooth 2172B.

In operation, the closing forces $F_{closing}$ imparted on the slide device 2120 by the higher-pressure side or volume 102 in the rotary machine moves the slide device 2120 toward the rotating component 2006. The outer end 1982 of the upstream hybrid tooth 2172A first comes into close proximity with the radial surface 2086 of the rotating component 2006 to reduce the flow of fluid between the slide device 2120 and the rotating component 2006. Continued movement of the slide device 2120 causes the downstream hybrid tooth 2172B to also come into close proximity with the radial surface 2086 of the rotating component 2006 to further reduce the flow of fluid between the slide device 2120 and the rotating component 2006. Continued movement of the slide device 2120 causes the outer end 1982 of the upstream hybrid tooth 2172A to form a fluid bearing or seal with the axial surface 2088 of the rotating component 2006, as described herein.

Figure 22:
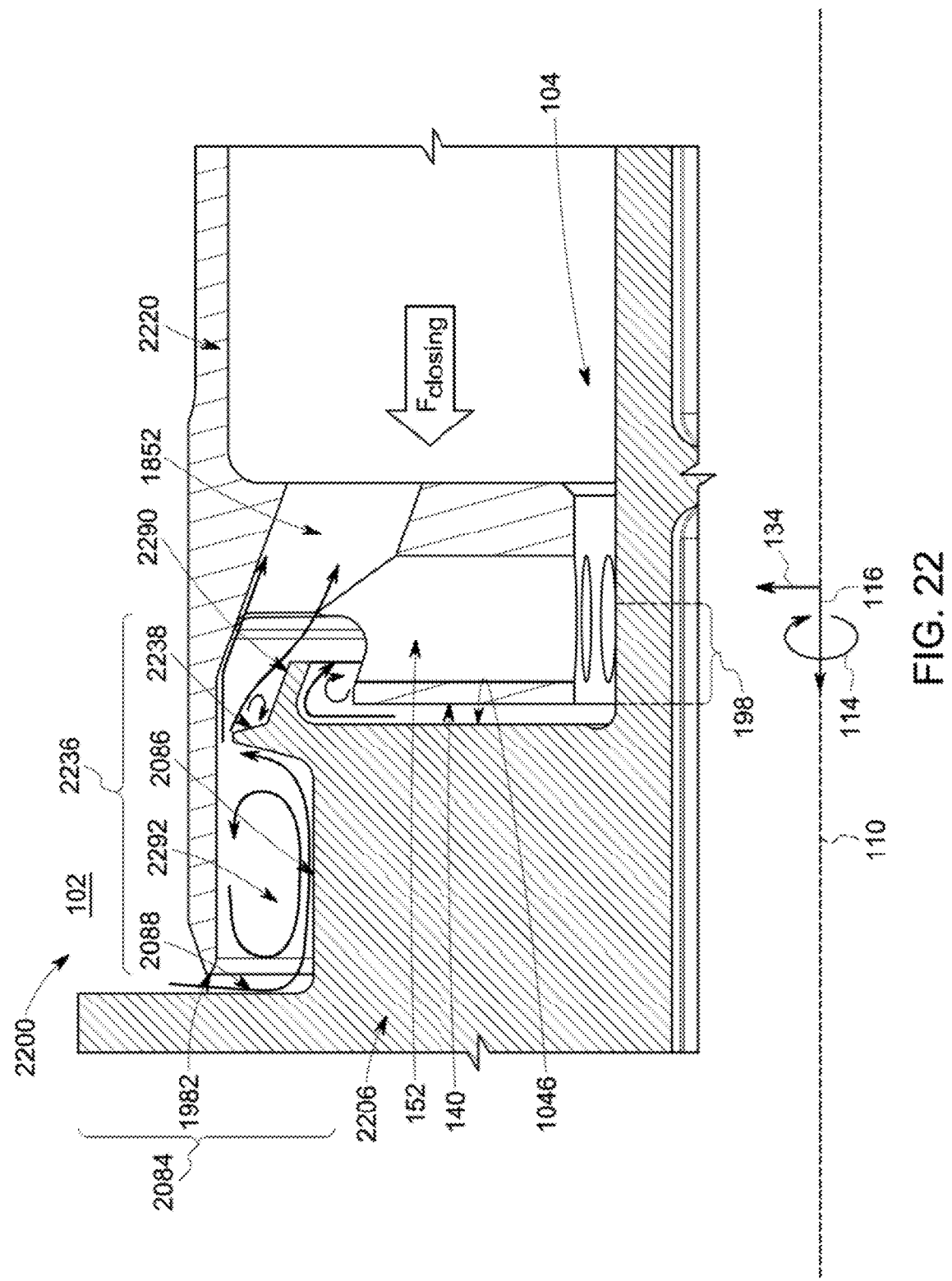
FIG. 22 illustrates a cross-sectional view of a slide device and a rotating component of another embodiment of a seal assembly.

FIG. 22 illustrates a cross-sectional view of a slide device 2220 and a rotating component 2206 of another embodiment of a seal assembly 2200. The seal assembly 2200 can represent the seal assembly 100 shown in FIG. 1. For example, the seal assembly 2200 can be positioned between a stationary component (e.g., a stator) and a rotating component 2206 (e.g., a rotor) of a rotary machine (e.g., a turbomachine) to reduce or prevent fluid leakage from a higher fluid pressure side or volume 102 of the rotary machine to a lower fluid pressure side or volume 104 of the rotary machine.

The slide device 2220 includes a primary tooth 2236 that is elongated along the axial direction 116 to an outer end 1982. The slide device 2220 also includes the slanted cross-over ports 1852 and the radial cross-over ports 152, as described above. The rotating component 2206 includes the step 2084 having the radial surface 2086 and the axial surface 2088. The rotating component 2206 includes a starter tooth 2238 that is elongated along the radial direction 134. The starter tooth 2238 optionally can include a flow dividing tooth 2290 that is angled back toward the cross-over ports 152, 1852 of the slide device 2220. For example, the flow dividing tooth 2290 can be elongated in a direction that is angled inward toward the axis of rotation 110.

In operation, the closing forces $F_{closing}$ imparted by the fluid pressure in the higher-pressure side or volume 102 of the rotary machine moves the slide device 2220 toward the rotating component 2206. The primary tooth 2236 of the slide device 2220 moves in the axial direction 116 and over (e.g., radially outside of) the starter tooth 2238 of the rotating component 2206. This relative movement restricts or reduces the space between the radially inward surface of the primary tooth 2236 and the starter tooth 2238. This reduction can reduce the amount of fluid that can pass (e.g., leak) between the rotating component 2206 and the slide device 2220.

Further movement of the slide device 2220 in the axial direction 116 results in the outer end 1982 of the primary tooth 2236 coming in close proximity to the rotating component 2206 such that a film bearing or seal is formed between the primary tooth 2236 and the axial surface of the outer end 1982 of the rotating component 2206. The combination of the primary tooth 2236 and the starter tooth 2238 can form a chamber 2292 between the slide device 2220 and the rotating component 2206, as shown in FIG. 22. At least some of the fluid that passes between the primary tooth 2236 and the axial surface of the rotating component 2206 may circulate or remain within this chamber 2292. Some of the fluid that does pass out of the chamber 2292 between the starter tooth 2238 and the radially inward surface of the primary tooth 2236 can be directed to the lower pressure side 104 via the slanted cross-over ports 1852 by the angled tooth 2290 of the rotating component 2206. Other fluid that does pass out of the chamber 2292 between the starter tooth 2238 and the radially inward surface of the primary tooth 2236 can flow to the lower pressure side 104 via the radial cross-over ports 152.

Figure 23:
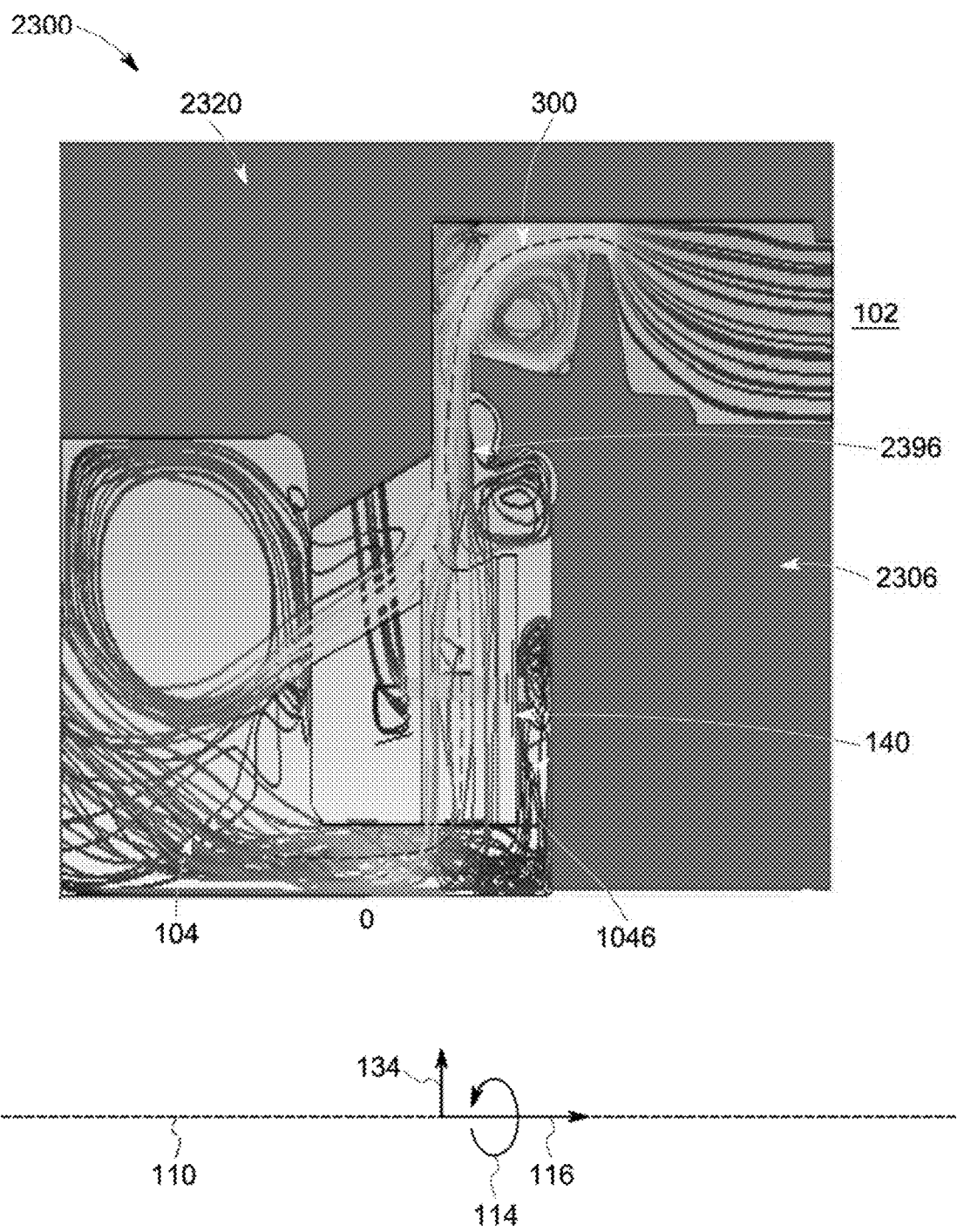
FIG. 23 illustrates a cross-sectional view of a slide device and a rotating component of another embodiment of a seal assembly.
Figure 25:
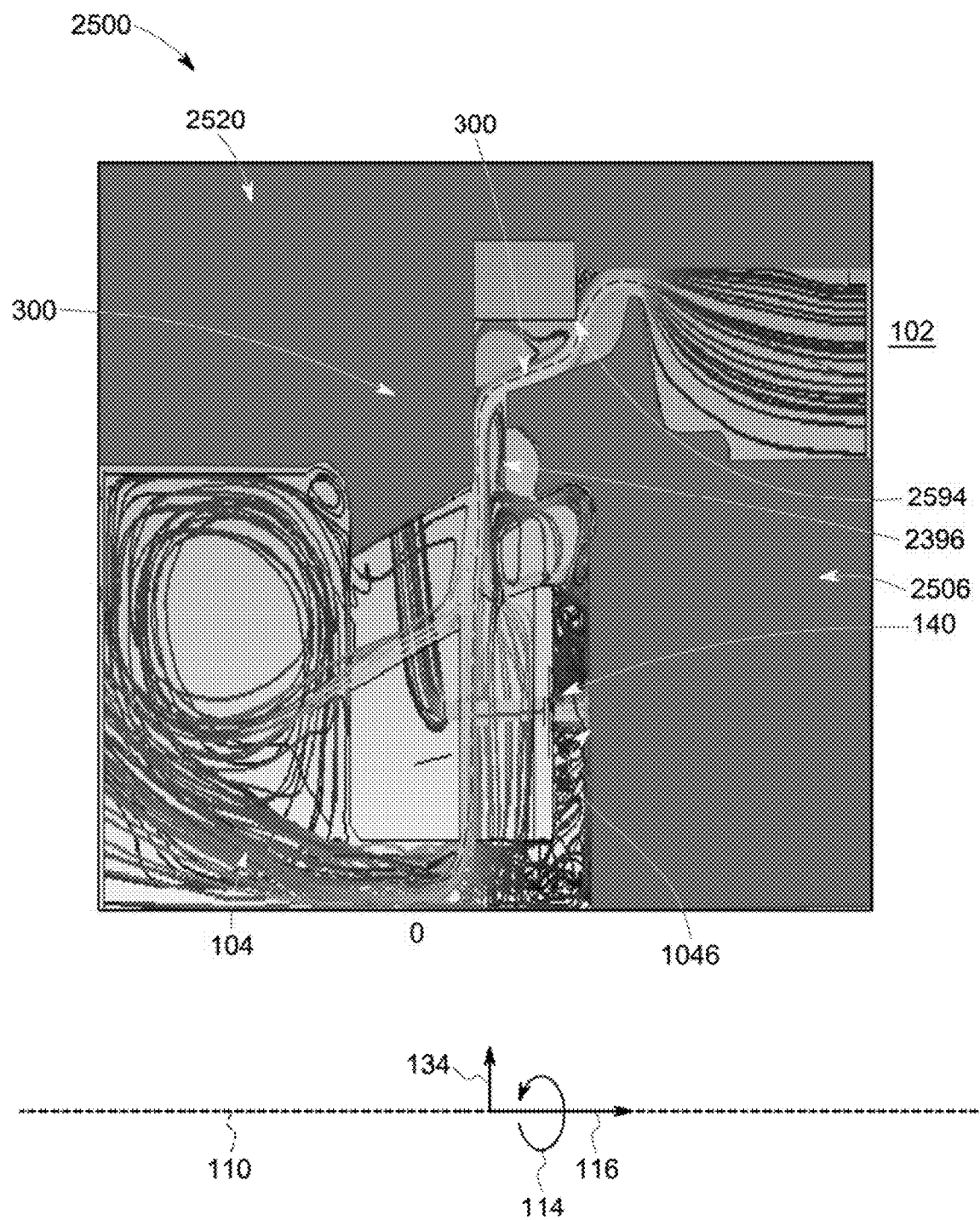
FIG. 25 illustrates a cross-sectional view of a slide device and a rotating component of another embodiment of a seal assembly.

FIGS. 23 through 25 illustrate cross-sectional views of additional embodiments of seal assemblies 2300, 2400, 2500. Each of the seal assemblies 2300, 2400, 2500 includes a slide device 2320, 2420, 2520 that interfaces with a rotating component 2306, 2406, 2506 to prevent or reduce fluid leakage along the leakage paths 300 from a higher-pressure side or volume 102 of a rotary machine to a lower pressure side or volume 104 of the rotary machine. The slide devices 2320, 2420, 2520 can represent the slide device 120 shown in FIG. 1. One difference between the seal assemblies 2300, 2400, 2500 is the presence and/or size of a protrusion 2494, 2594 of the slide devices 2420, 2520 that extends toward the rotating components 2406, 2506. The slide device 2320 does not include a protrusion, but the slide devices 2420, 2520 include different sized protrusions 2494, 2594.

The protrusions 2494, 2594 extend along the axial direction 116 toward the rotating component 2406, 2506 by the same distance, but extend radially inward by different distances. As shown in FIGS. 24 and 25, the protrusion 2594 extends farther toward the axis of rotation 110 than the protrusion 2494. The slide device 2320 does not include this protrusion 2494, 2594.

The protrusions 2494, 2594 can be formed as collars or steps (in the cross-sectional views) that extend around the axis of rotation 110. The protrusions 2494, 2594 can reduce the leakage of fluid along the leakage path 300 between the slide devices 2420, 2520 and the rotating components 2406, 2506. Several flow lines 2396 are shown in FIGS. 23 through 25. Increased numbers and/or densities of the flow lines 2396 indicate greater fluid flow whereas decreased numbers and/or densities of the flow lines 2396 indicate reduced fluid flow.

As shown by a comparison of the flow lines 2396 in FIGS. 23 through 25, the addition of the protrusions 2494, 2594 to the slide device 2420, 2520 reduces the flow of fluid along the leakage path 300 (relative to the slide device 2320 that does not include the protrusion 2494 or 2594, and the larger protrusion 2594 reduces the flow of fluid along the leakage path 300 more than the smaller protrusion 2494. Adding the protrusion 2494, 2594 to one or more of the slide devices described herein can reduce the leakage of fluid along the leakage path 300.

One or more components of the seal assemblies shown or described herein can be manufactured using additive manufacturing. For example, the slide devices can be formed using three-dimensional printing or binder jetting, photopolymerization, powder bed fusion, material jetting, sheet lamination, material extrusion, directed energy deposition (e.g., laser cladding), or the like. The complex shapes and interconnected features of the components described herein may be more easily formed using additive manufacturing or may have shapes that prevent use of other techniques to form the components.

Figure 26:
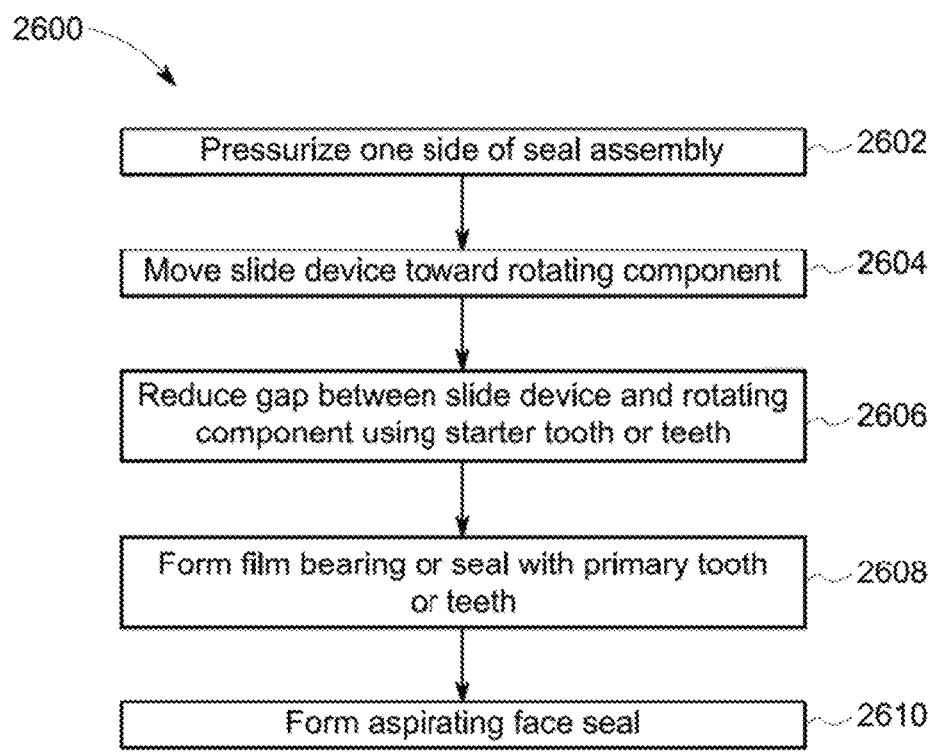
FIG. 26 illustrates a flowchart of one embodiment of a method for preventing or reducing fluid leakage between a higher fluid pressure volume of a rotary machine and a lower fluid pressure volume of the rotary machine.

FIG. 26 illustrates a flowchart of one embodiment of a method 2600 for preventing or reducing fluid leakage between a higher fluid pressure volume of a rotary machine and a lower fluid pressure volume of the rotary machine. The method 2600 can represent operation of one or more of the seal assemblies described herein.

At 2602, one side of a seal assembly is pressurized. For example, an upstream side of the rotary machine can be pressurized with fluid, such as air. The pressurization can occur as the rotating component of the rotary machine begins rotating around an axis of rotation. For example, a rotor of the rotary machine that has air foils or blades can begin rotating due to the introduction of air on one side of the air foils or blades. At 2604, a slide device of the seal assembly moves toward the rotating component of the rotary machine. The forces exerted on the slide device can move the slide device parallel to the axis of rotation toward the rotating component.

At 2606, one or more starter teeth of the slide device and/or of the rotating component reduces a spatial gap between the slide device and the rotating component. The starter tooth or teeth can reduce the space between the slide device and the rotating component to reduce how much fluid can pass between the slide device and the rotating component. This can increase the pressure drop of the fluid between the higher pressure on one side of the seal assembly and another side of the seal assembly, such as downstream of the air foils or blades of the turbomachine.

At 2608, one or more primary teeth of the slide device and/or the rotating component can come into closer proximity with the other of the slide device or the rotating component to form a film bearing or seal between (a) the primary tooth or teeth and (b) the slide device or the rotating component. The primary tooth or teeth can form the bearing or seal to further reduce fluid leakage between the slide device and the rotating component and further increase the pressure drop across the seal assembly.

At 2610, a seal bearing face of the slide device comes into close proximity with the rotating component to form an aspirating face seal between the slide device and the rotating component. This seal can have aerostatic and/or aerodynamic components, as described above, due to features in the slide device and/or rotating component. This seal can adapt to changes in the shape of the rotating component in the axial direction without resulting in rubbing or contact between the slide device and the rotating component, while preventing or reducing significant fluid leakage between the slide device and the rotating component.

In one embodiment, a rotary machine includes a rotating component configured to rotate around a rotation axis relative to a stationary component and an aspirating seal assembly disposed between the rotating component and the stationary component. The seal assembly has a slide device coupled with a seal bearing. The slide device is configured to create a pressure drop between (a) a first fluid pressure volume that is radially outside of the slide device and the rotating component and (b) a different, second fluid pressure volume that is radially inside the slide device between the slide device and the rotating component along one or more radial directions. The slide device is configured to axially move the seal bearing toward an annular surface of the rotating component and to form a film bearing between the seal bearing and the annular surface of the rotating component responsive to pressurization of the rotary machine. One or more of the slide device or the rotating component include one or more starter teeth configured to restrict a fluid leakage path extending between the higher fluid pressure volume and the lower fluid pressure volume and extending between the slide device and the rotating component. The one or more starter teeth are configured to reduce a size of the fluid leakage path responsive to the slide device axially moving toward the annular surface of the rotating component. One or more of the slide device or the rotating component include one or more primary sealing teeth configured to engage another of the slide device or the rotating component to form a fluid seal across the fluid leakage path between the slide device and the rotating component responsive to the slide device axially moving toward the annular surface of the rotating component.

Optionally, the one or more primary sealing teeth include an upstream primary tooth and a downstream primary tooth, the upstream primary tooth located upstream of the downstream primary tooth in the fluid leakage path. Both the upstream primary tooth and the downstream primary tooth can be coupled with the slide device and axially extend from the slide device toward the rotating component. The upstream primary tooth may extend a longer axial length than the downstream primary tooth. The upstream primary tooth can be coupled with the rotating component and the downstream primary tooth can be coupled with the slide device. The one or more starter teeth may include an upstream starter tooth and a downstream starter tooth, where the upstream starter tooth is located upstream of the downstream starter tooth in the fluid leakage path. At least one of the primary starter teeth can be coupled with and axially protrude from the upstream starter tooth.

Optionally, the rotating component includes a directional hooked tooth having a curved surface that bends inward toward the axis of rotation. The curved surface of the directional hooked tooth can be shaped and positioned to direct fluid in the interior lower fluid pressure volume through one or more cross-over ports in the slide device to the lower fluid pressure volume.

At least one of the primary sealing teeth can include a flow protuberance radially projecting from the at least one primary sealing tooth. The flow protuberance may be positioned to introduce turbulent flow into fluid flowing along the fluid leakage path upstream of the one or more primary sealing teeth.

At least one of the primary sealing teeth and at least one of the starter teeth can be included in a single hybrid sealing tooth. The rotating component can include a step formed from an axially elongated segment and a radially elongated segment of the rotating component, and the hybrid sealing tooth can axially extend from the slide device toward the axially elongated segment of the rotating component. The hybrid sealing tooth (a) can be positioned and shaped to first reduce the size of the fluid leakage path between the hybrid sealing tooth and the axially elongated segment of the rotating component and (b) can be positioned and shaped to subsequently engage and form a seal between an outer end of the hybrid sealing tooth and the radially elongated segment of the rotating component as the slide device axially moves toward the rotating component. The single hybrid sealing tooth can be an upstream hybrid sealing tooth, and at least one additional primary sealing tooth and at least one additional starter tooth can be included in a downstream hybrid sealing tooth. Both the upstream and the downstream hybrid sealing teeth can be elongated in directions angled between an axial direction and a radial direction of the rotary machine.

In one embodiment, a seal assembly of a rotary machine includes a slide device coupled with a seal bearing. The slide device is configured to create a pressure drop between higher and lower pressure sides of the rotary machine. The slide device includes one or more starter teeth configured to restrict a fluid leakage path between the slide device and a rotating component of the rotary machine. The one or more starter teeth are configured to reduce a size of the fluid leakage path responsive to the slide device axially moving toward the rotating component. The slide device also includes one or more primary sealing teeth configured to form a fluid seal across the fluid leakage path between the slide device and the rotating component responsive to the slide device axially moving toward the annular surface of the rotating component.

Optionally, the one or more primary sealing teeth include an upstream primary tooth and a downstream primary tooth. The upstream primary tooth can be located upstream of the downstream primary tooth in the fluid leakage path.

The rotating component can include a directional hooked tooth having a curved surface that bends inward toward the axis of rotation. The curved surface of the directional hooked tooth can be shaped and positioned to direct fluid in the interior lower fluid pressure volume through one or more cross-over ports in the slide device to the lower fluid pressure volume.

At least one of the primary sealing teeth can include a flow protuberance radially projecting from the at least one primary sealing tooth. The flow protuberance can be positioned to introduce turbulent flow into fluid flowing along the fluid leakage path upstream of the one or more primary sealing teeth.

At least one of the primary sealing teeth and at least one of the starter teeth can be included in a single hybrid sealing tooth.

In one embodiment, a seal assembly of a rotary machine includes a rotating component and a slide device coupled with a seal bearing. The slide device is configured to create a pressure drop between higher and lower pressure sides of the rotary machine. The slide device includes one or more starter teeth configured to restrict a fluid leakage path between the slide device and a rotating component of the rotary machine. The one or more starter teeth are configured to reduce a size of the fluid leakage path responsive to the slide device axially moving toward the rotating component. The slide device also includes one or more primary sealing teeth configured to form a fluid seal across the fluid leakage path between the slide device and the rotating component responsive to the slide device axially moving toward the annular surface of the rotating component.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A rotary machine comprising:
a rotating component configured to rotate around a rotation axis relative to a stationary component; and
an aspirating seal assembly disposed between the rotating component and the stationary component, the seal assembly having a slide device coupled with a seal bearing, the slide device configured to create a pressure drop between (a) a first fluid pressure volume that is radially outside of the slide device and the rotating component and (b) a different, second fluid pressure volume that is radially inside the slide device between the slide device and the rotating component along one or more radial directions, the slide device configured to axially move the seal bearing toward an annular surface of the rotating component and to form a film bearing between the seal bearing and the annular surface of the rotating component responsive to pressurization of the rotary machine,
wherein one or more of the slide device or the rotating component include one or more starter teeth, the one or more starter teeth configured to restrict a fluid leakage path extending between the first fluid pressure volume and the second fluid pressure volume and extending between the slide device and the rotating component, the one or more starter teeth configured to reduce a size of the fluid leakage path responsive to the slide device axially moving toward the annular surface of the rotating component,
wherein one or more of the slide device or the rotating component include one or more primary sealing teeth, the one or more primary teeth configured to engage another of the slide device or the rotating component to form a fluid seal across the fluid leakage path between the slide device and the rotating component responsive to the slide device axially moving toward the annular surface of the rotating component,
wherein the rotating component includes a directional hooked tooth having a curved surface that bends inward toward and perpendicular to the axis of rotation.

2. The rotary machine of claim 1, wherein the one or more primary sealing teeth include an upstream primary tooth and a downstream primary tooth, the upstream primary tooth located upstream of the downstream primary tooth in the fluid leakage path.

3. The rotary machine of claim 2, wherein both the upstream primary tooth and the downstream primary tooth are coupled with the slide device and axially extend from the slide device toward the rotating component.

4. The rotary machine of claim 2, wherein the upstream primary tooth extends a longer axial length than the downstream primary tooth.

5. The rotary machine of claim 2, wherein the upstream primary tooth is coupled with the rotating component and the downstream primary tooth is coupled with the slide device.

6. The rotary machine of claim 2, wherein the one or more starter teeth include an upstream starter tooth and a downstream starter tooth, the upstream starter tooth located upstream of the downstream starter tooth in the fluid leakage path.

7. The rotary machine of claim 6, wherein at least one of the primary starter teeth is coupled with and axially protrudes from the upstream starter tooth.

8. The rotary machine of claim 1, wherein the curved surface of the directional hooked tooth is shaped and positioned to direct fluid in an interior lower fluid pressure volume through one or more cross-over ports in the slide device.

9. The rotary machine of claim 1, wherein at least one of the primary sealing teeth includes a flow protuberance radially projecting from the at least one of the primary sealing teeth, the flow protuberance positioned to introduce turbulent flow into fluid flowing along a fluid leakage path upstream of the one or more primary sealing teeth.

10. The rotary machine of claim 1, wherein at least one of the primary sealing teeth and at least one of the starter teeth are included in a single hybrid sealing tooth.

11. The rotary machine of claim 10, wherein the rotating component includes a step formed from an axially elongated segment and a radially elongated segment of the rotating component, and
wherein the hybrid sealing tooth axially extends from the slide device toward the axially elongated segment of the rotating component.

12. The rotary machine of claim 11, wherein the hybrid sealing tooth (a) is positioned and shaped to first reduce the size of the fluid leakage path between the hybrid sealing tooth and the axially elongated segment of the rotating component and (b) is positioned and shaped to subsequently engage and form a seal between an outer end of the hybrid sealing tooth and the radially elongated segment of the rotating component as the slide device axially moves toward the rotating component.

13. The rotary machine of claim 10, wherein the single hybrid sealing tooth is an upstream hybrid sealing tooth, and at least one additional primary sealing tooth and at least one additional starter tooth are included in a downstream hybrid sealing tooth.

14. The rotary machine of claim 13, wherein both the upstream and the downstream hybrid sealing teeth are elongated in directions angled between an axial direction and a radial direction of the rotary machine.

15. A seal assembly of a rotary machine, the seal assembly comprising:
   a slide device coupled with a seal bearing, the slide device configured to create a pressure drop between higher and lower pressure sides of the rotary machine,
   wherein the slide device includes:
   one or more starter teeth configured to restrict a fluid leakage path between the slide device and a rotating component of the rotary machine, the one or more starter teeth configured to reduce a size of the fluid leakage path responsive to the slide device axially moving toward the rotating component, and
   one or more primary sealing teeth configured to form a fluid seal across the fluid leakage path between the slide device and the rotating component responsive to the slide device axially moving toward an annular surface of the rotating component,
   wherein the rotating component includes a directional hooked tooth having a curved surface that bends inward toward and perpendicular to the axis of rotation.

16. The seal assembly of claim 15, wherein the one or more primary sealing teeth include an upstream primary tooth and a downstream primary tooth, the upstream primary tooth located upstream of the downstream primary tooth in the fluid leakage path.

17. The seal assembly of claim 15, wherein the curved surface of the directional hooked tooth is shaped and positioned to direct fluid in an interior lower fluid pressure volume through one or more cross-over ports in the slide device.

18. The seal assembly of claim 15, wherein at least one of the primary sealing teeth includes a flow protuberance radially projecting from the at least one of the primary sealing teeth, the flow protuberance positioned to introduce turbulent flow into fluid flowing along a fluid leakage path upstream of the one or more primary sealing teeth.

19. The seal assembly of claim 15, wherein at least one of the primary sealing teeth and at least one of the starter teeth are included in a single hybrid sealing tooth.

20. A seal assembly of a rotary machine, the seal assembly comprising:
   a rotating component configured to rotate around an axis of rotation, the rotating component including a directional hooked tooth having a curved surface that bends inward toward and perpendicular to the axis of rotation; and
   a slide device coupled with a seal bearing, the slide device including one or more cross-over ports and configured to create a pressure drop between higher and lower pressure sides of the rotary machine,
   wherein the slide device includes:
   one or more starter teeth configured to restrict a fluid leakage path between the slide device and a-the rotating component of the rotary machine, the one or more starter teeth configured to reduce a size of the fluid leakage path responsive to the slide device axially moving toward the rotating component, and
   one or more primary sealing teeth configured to form a fluid seal across the fluid leakage path between the slide device and the rotating component responsive to the slide device axially moving toward an annular surface of the rotating component,
   wherein the curved surface of the directional hooked tooth shaped and positioned to direct fluid in the lower pressure side through the one or more cross-over ports in the slide device.

* * * * *